US012587902B2

(12) United States Patent
Turner et al.

(10) Patent No.: US 12,587,902 B2
(45) Date of Patent: Mar. 24, 2026

(54) MESSAGE REDUNDANCY BETWEEN USER DEVICES

(71) Applicant: Apple Inc., Cupertino, CA (US)

(72) Inventors: Benjamin S. Turner, San Francisco, CA (US); Blake S. Kaplan, San Francisco, CA (US); Toshiro Yamada, San Francisco, CA (US); Keith W. Rauenbuehler, San Francisco, CA (US); Justin N. Wood, Sunnyvale, CA (US); Nicholas J. Circosta, Mountain View, CA (US); Bhaskar P. Sarma, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 598 days.

(21) Appl. No.: 18/071,954

(22) Filed: Nov. 30, 2022

(65) Prior Publication Data

US 2023/0239734 A1 Jul. 27, 2023

Related U.S. Application Data

(60) Provisional application No. 63/302,866, filed on Jan. 25, 2022.

(51) Int. Cl.
*H04W 28/06* (2009.01)
*H04W 4/12* (2009.01)

(52) U.S. Cl.
CPC ............. *H04W 28/06* (2013.01); *H04W 4/12* (2013.01)

(58) Field of Classification Search
CPC ............. H04L 12/2803; H04L 12/2816; H04L 12/2818; H04L 12/2821; H04L 63/10; H04W 4/12; H04W 28/06
See application file for complete search history.

(56) References Cited

U.S. PATENT DOCUMENTS 9,191,237 B1 * 11/2015 Barry ...................... H04L 51/58
10,972,893 B1 * 4/2021 Vangala .................. H04W 4/46
(Continued)

FOREIGN PATENT DOCUMENTS

EP 2811771 A1 12/2014
WO 2016172213 A1 10/2016

OTHER PUBLICATIONS

International Patent Application No. PCT/US2023/011364 , "Invitation to Pay Additional Fees and, Where Applicable, Protest Fee", Apr. 12, 2023, 8 pages.

(Continued)

*Primary Examiner* — Jeong S Park
(74) *Attorney, Agent, or Firm* — BAKERHOSTETLER; Kyle B. Morse

(57) ABSTRACT

Techniques are disclosed for managing message redundancy for one or more devices. In one example, a device receives a message from a second device using a transmission protocol, the message comprising a control instruction for an accessory device and a message identifier. The device can transmit using the transmission protocol, a second message to the accessory device, the second message comprising the control instruction and a second message identifier. The device can receive a third message from the second device using a second transmission protocol, the second message comprising a second control instruction for the accessory device and a third message identifier. The device can compare the third message identifier with the message identifier to determine whether the second control instruction is a duplicate of the control instruction. The device can determine whether to transmit the third message to the accessory device based on the comparison.

20 Claims, 11 Drawing Sheets

(56)            References Cited

U.S. PATENT DOCUMENTS

| | | |
|---|---|---|
| 2007/0291751 A1 | 12/2007 | Smith et al. |
| 2014/0105033 A1 | 4/2014 | Vasseur et al. |
| 2014/0304238 A1 * | 10/2014 | Halla-Aho ............ H04L 51/212 |
| | | 707/692 |
| 2015/0249726 A1 * | 9/2015 | Kuroiwa ................. H04L 67/10 |
| | | 709/247 |
| 2016/0182432 A1 * | 6/2016 | De ........................... H04L 69/28 |
| | | 709/204 |
| 2017/0103755 A1 * | 4/2017 | Jeon ......................... G06F 3/167 |
| 2019/0034051 A1 * | 1/2019 | Jeon .................... H04L 12/2816 |
| 2020/0349952 A1 * | 11/2020 | Lee ......................... G10L 15/22 |

OTHER PUBLICATIONS

International Patent Application No. PCT/US2023/011364 , "International Search Report and Written Opinion", Jun. 5, 2023, 15 pages.
International Patent Application No. PCT/US2023/011364, "International Preliminary Report on Patentability", Aug. 8, 2024, 10 pages.

* cited by examiner

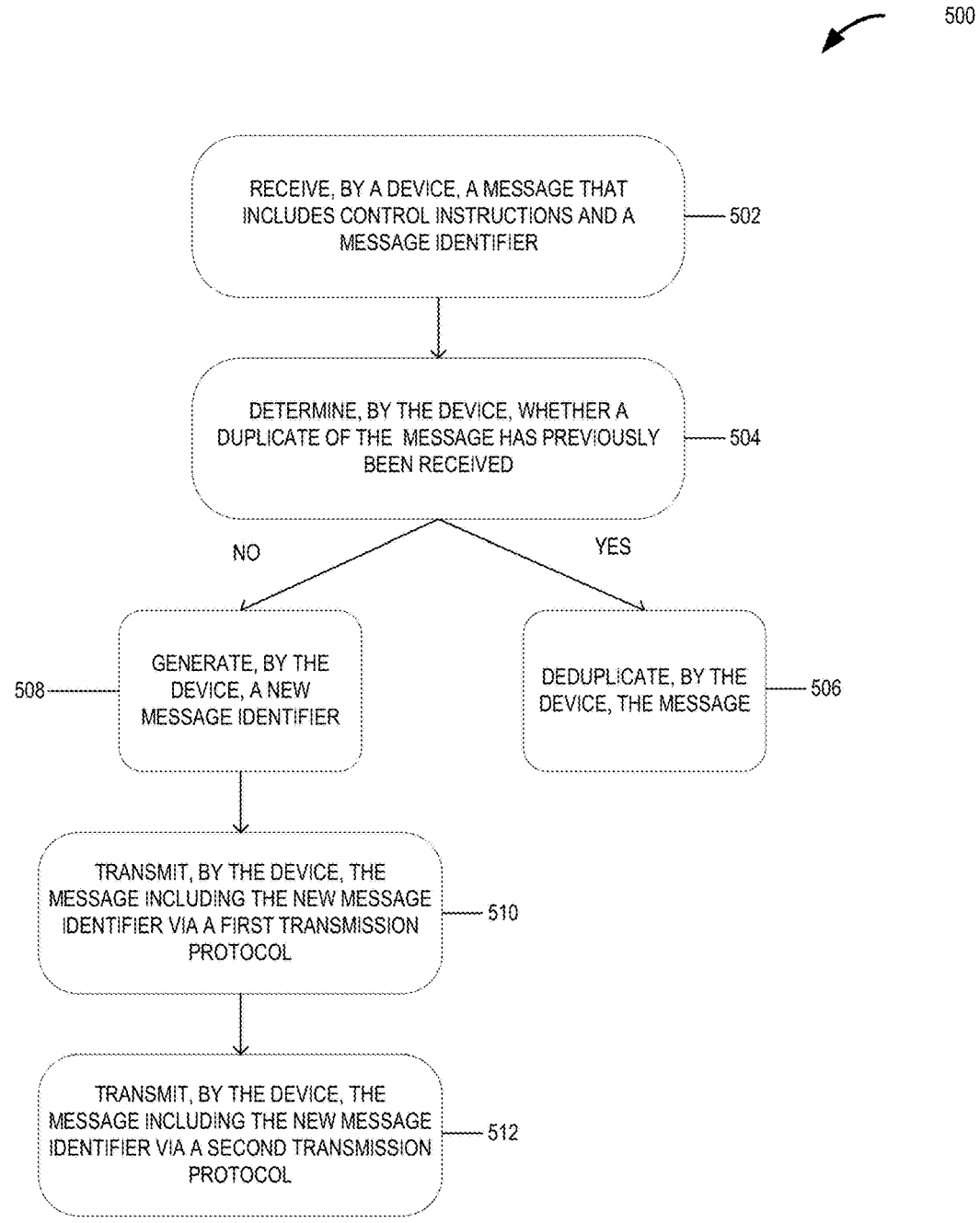

500

RECEIVE, BY A DEVICE, A MESSAGE THAT INCLUDES CONTROL INSTRUCTIONS AND A MESSAGE IDENTIFIER ——— 502

DETERMINE, BY THE DEVICE, WHETHER A DUPLICATE OF THE MESSAGE HAS PREVIOUSLY BEEN RECEIVED ——— 504

NO          YES

508 ——— GENERATE, BY THE DEVICE, A NEW MESSAGE IDENTIFIER

DEDUPLICATE, BY THE DEVICE, THE MESSAGE ——— 506

TRANSMIT, BY THE DEVICE, THE MESSAGE INCLUDING THE NEW MESSAGE IDENTIFIER VIA A FIRST TRANSMISSION PROTOCOL ——— 510

TRANSMIT, BY THE DEVICE, THE MESSAGE INCLUDING THE NEW MESSAGE IDENTIFIER VIA A SECOND TRANSMISSION PROTOCOL ——— 512

FIG. 5

600

RECEIVE, BY A DEVICE, A MESSAGE THAT INCLUDES CONTROL INSTRUCTIONS AND A MESSAGE IDENTIFIER ——602

DETECT, BY THE DEVICE, THE MESSAGE IDENTIFIER ——604

DETERMINE, BY THE DEVICE, WHETHER THE MESSAGE IDENTIFIER MATCHES PREVIOUSLY STORED MESSAGE IDENTIFIERS IN A LOCAL MEMORY —— 606

NO                 YES

610—— STORE, BY THE DEVICE, THE MESSAGE IDENTIFIER IN THE LOCAL MEMORY

DEDUPLICATE, BY THE DEVICE, THE MESSAGE ——608

FIG. 6

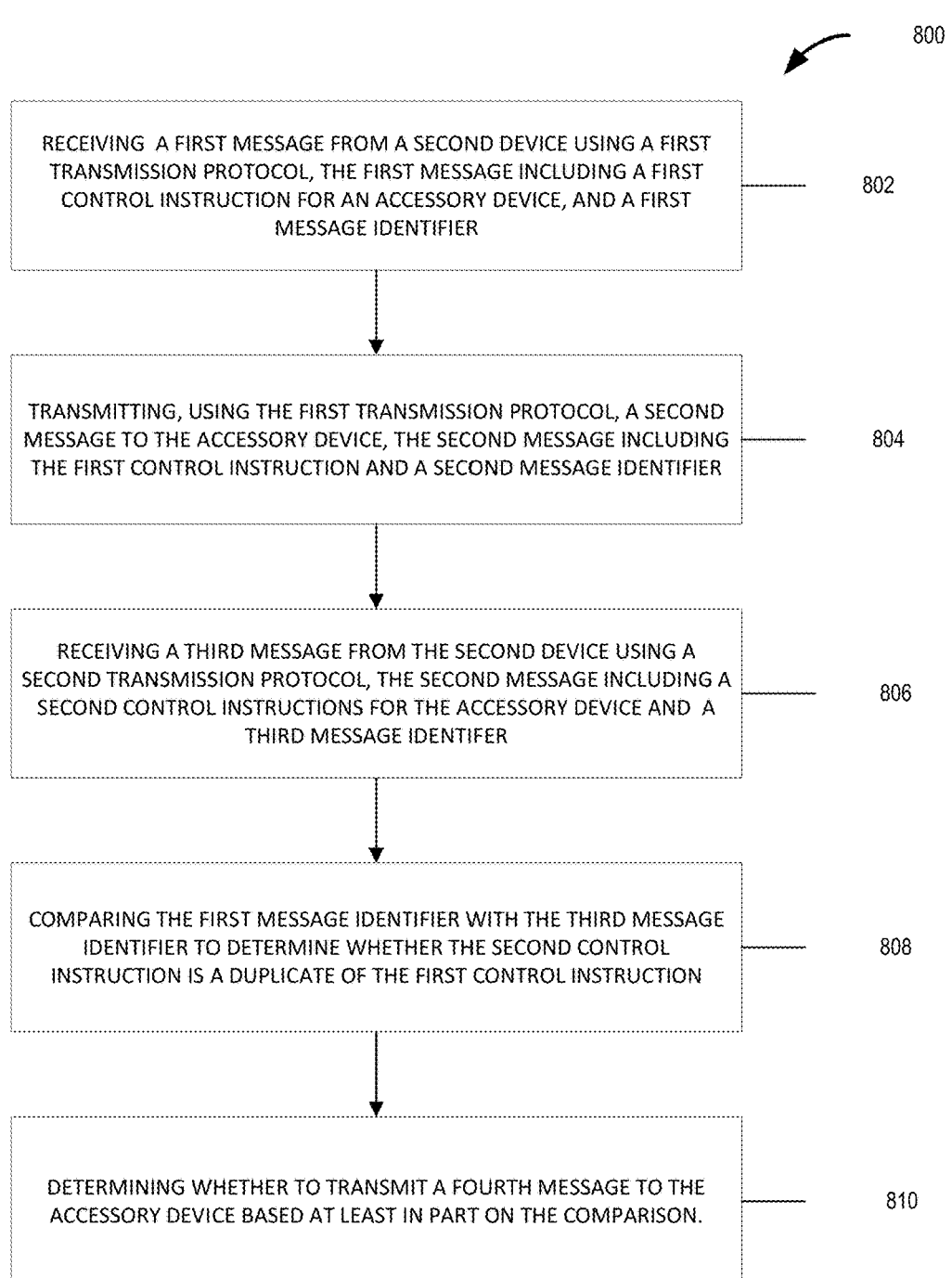

800

RECEIVING A FIRST MESSAGE FROM A SECOND DEVICE USING A FIRST TRANSMISSION PROTOCOL, THE FIRST MESSAGE INCLUDING A FIRST CONTROL INSTRUCTION FOR AN ACCESSORY DEVICE, AND A FIRST MESSAGE IDENTIFIER — 802

TRANSMITTING, USING THE FIRST TRANSMISSION PROTOCOL, A SECOND MESSAGE TO THE ACCESSORY DEVICE, THE SECOND MESSAGE INCLUDING THE FIRST CONTROL INSTRUCTION AND A SECOND MESSAGE IDENTIFIER — 804

RECEIVING A THIRD MESSAGE FROM THE SECOND DEVICE USING A SECOND TRANSMISSION PROTOCOL, THE SECOND MESSAGE INCLUDING A SECOND CONTROL INSTRUCTIONS FOR THE ACCESSORY DEVICE AND A THIRD MESSAGE IDENTIFER — 806

COMPARING THE FIRST MESSAGE IDENTIFIER WITH THE THIRD MESSAGE IDENTIFIER TO DETERMINE WHETHER THE SECOND CONTROL INSTRUCTION IS A DUPLICATE OF THE FIRST CONTROL INSTRUCTION — 808

DETERMINING WHETHER TO TRANSMIT A FOURTH MESSAGE TO THE ACCESSORY DEVICE BASED AT LEAST IN PART ON THE COMPARISON. — 810

FIG. 8

MESSAGE REDUNDANCY BETWEEN USER DEVICES

CROSS REFERENCES TO RELATED APPLICATIONS

This application claims the benefit of U.S. Provisional Application Ser. No. 63/302,866, filed Jan. 25, 2022; the disclosure of which is hereby incorporated by reference in its entirety for all purposes.

BACKGROUND

Electronic devices are becoming increasingly popular in a range of applications. Mobile phones, tablet computers, home entertainment systems, and the like are just some of the electronic devices that users interact with regularly. Another category of electronic devices that is becoming more popular includes various electronically controllable devices, such as thermostats, lighting devices, household appliances, etc. However, challenges exist with sending messages from one device to another, especially when there are multiple types of network connections available.

BRIEF SUMMARY

In some implementations, a device may receive duplicate messages via different transmission protocols. For example, the device may receive a first message via a first transmission protocol and a second message via a second transmission protocol. The second message can be a duplicate of the first message. The device may determine whether to transmit one of the first message or the second message based on a latency of each message. The device may further determine to deduplicate the other of the first message or second message.

In some implementations, the device continuously receives messages, including the first message and the second message, from other devices in a home environment. The device may determine that the first message and the second message are duplicates of each other. The device may further determine to transmit the first received message of the first message and the second message. The device may further determine to deduplicate the second received message of the first message and second message.

In some implementations, the computing device detects a message identifier for each received message. For example, if the first message is received, the computing device may detect the message identifier of the first message. The computing device may then compare the message identifier to the message identifiers of previously received messages stored at the computing device. If the computing device detects a duplicate of the message identifier, the computing device may conclude that the second message was received first in time and that the first message is a duplicate. If, however, the computing device does not detect a duplicate of the message identifier, the computing device may conclude that the first message was received first in time. If the computing device determines that the first message was received first in time, the computing device may store the message identifier and transmits the first message to another device. When the second message does arrive, the computing device may compare the second message's message identifier to the stored message identifiers and may determine that the second message was received second in time and deduplicate the second message.

In some implementations, the computing device may transmit the first message via the first transmission protocol and a second duplicate message via the second transmission protocol. The receiving device may perform the same process as described above to determine which of the first message and the second message is received first in time.

Particular implementations offer at least the following advantages. Computing devices may transmit duplicate messages via different transmission protocols. Therefore, computing devices may take advantage of whichever transmission protocol offers lower latency at the time of transmission. Receiving devices may ascertain whether a message is a first instance of the message or a duplicate second instance of the message. The receiving devices may further deduplicate the duplicate messages to conserve memory storage and conserve operations from being performed on redundant messages.

BRIEF DESCRIPTION OF THE DRAWINGS

FIG. 5 is a process flow of deduplication, according to one or more embodiments.

FIG. 6 is a process flow for determining whether a duplicate message has previously been received, according to one or more embodiments.

FIG. 8 is a process flow for receiving duplicate messages, according to one or more embodiments.

DETAILED DESCRIPTION

Figure 1:
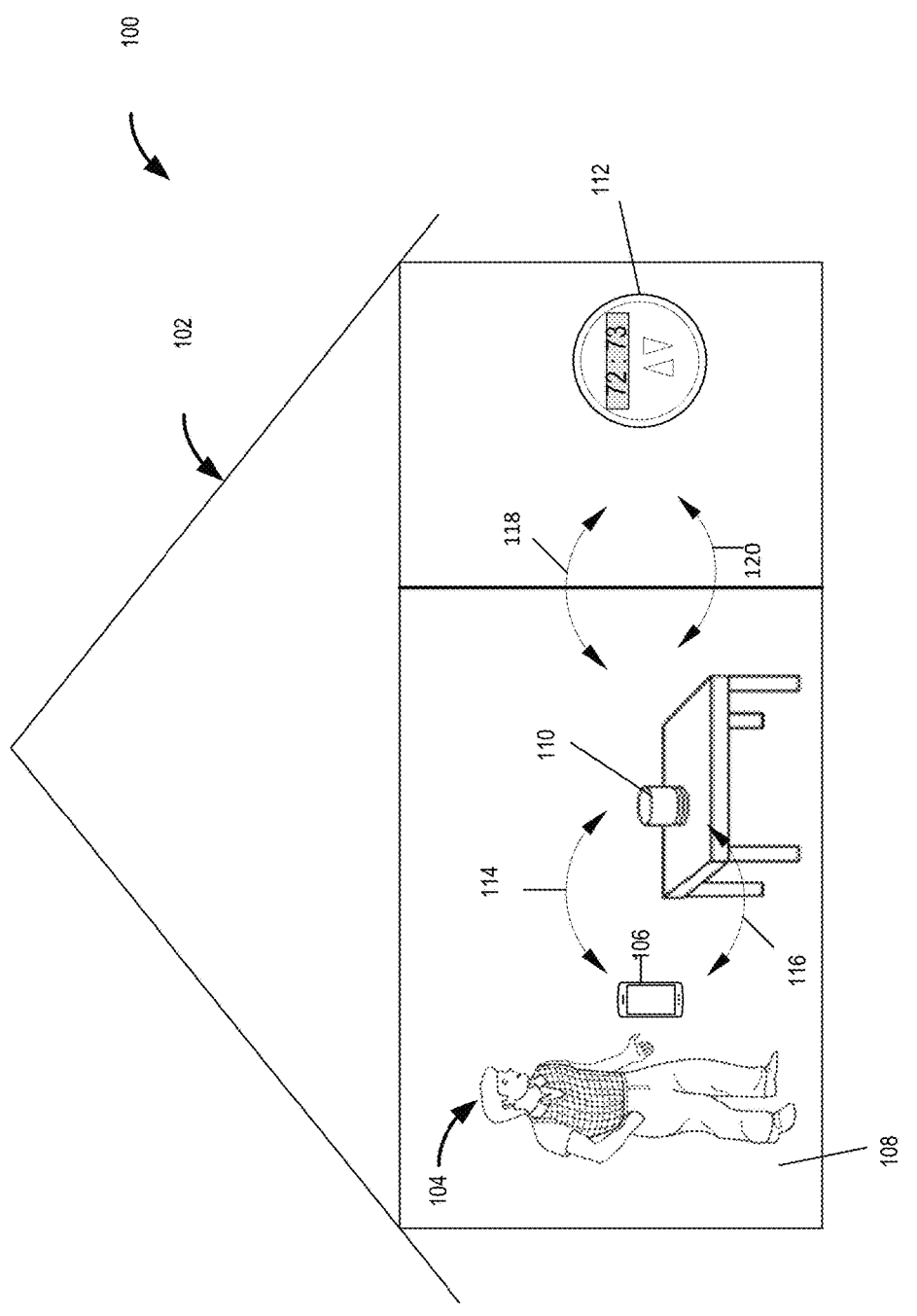
FIG. 1 is a simplified block diagram of an environment in which a device may transmit duplicated messages to another device, according to one or more embodiments.

In the following description, various examples will be described. For the purposes of explanation, specific configurations and details are set forth to provide a thorough understanding of the examples. However, it will also be apparent to one skilled in the art that the examples may be practiced without the specific details. Furthermore, well-known features may be omitted or simplified in order not to obscure the example being described.

Environments, for example, home or office environments, may include automation systems that connect devices in a network, and allow a network device to control one or more other network devices. Automation systems include a network of hardware, software, and communication interfaces that are interconnected via the internet through different transmission protocols (e.g., local area network, wide area network). Through the automation system, a device may be monitored and managed remotely through another device on the network. For example, a device (e.g., mobile device, voice-activated assistant) may send a command to a smart thermostat to change the temperature in a room or office space. In many instances, a device may have more than one transmission protocol available to send a message to another device. Furthermore, one of the transmission protocols may have a different latency than the other transmission protocol. Therefore, it may be advantageous for a device to transmit a message to another device via the transmission protocol having the lowest latency.

Certain embodiments permit a device to respectively transmit a message via a first transmission protocol and a duplicate message via a second transmission protocol. The redundancy increases the likelihood that the resident device receives the message regardless of the transmission protocol and/or regardless of the connectivity between the devices. The redundancy further allows the device to take advantage of whichever transmission protocol offers the lower latency. The device receiving the duplicate messages may determine which one of either the message sent via the first transmission protocol or the duplicate message sent via the second transmission protocol was received first. The device can then deduplicate the later received message based on the determination. The device may then transmit the first-received message to another device. In this way, whichever transmission protocol enabled a faster, better, or more efficient transmission of the message may be used to relay (e.g., forward) the message to another device. In some cases, one of the messages may never actually be received by the device (e.g., the sending device is not within range, loses connectivity, etc.). In that case, even though one message can be lost, the other one may be relayed appropriately.

The device receiving the duplicated message may execute various implementations of a deduplication protocol. In some embodiments, the device may delete one or more of the duplicate messages, only transmitting or processing one of the duplicate messages. In other embodiments, the device may temporarily store one or more of the duplicate messages, again only transmitting or processing one of the duplicate messages. Deduplication may be implemented to remove redundant data (e.g., duplicate messages), maintain a manageable data volume in the local storage of the computing device, and comply with memory management requirements.

In some embodiments, the device transmitting a message to another device may be configured to transmit a message to another device via a default transmission protocol (e.g., first transmission protocol or second transmission protocol). In these embodiments, the device includes a transport layer that monitors a respective signal latency of the default transmission protocol. The device may further elect to transmit a message via the default transmission protocol ((e.g., first transmission protocol or second transmission protocol) and a duplicate message via another transmission protocol (e.g., the other transmission protocol of the first transmission protocol or second transmission protocol), based on the monitored latency. For example, if the monitored latency of the default transmission protocol exceeds a threshold signal latency, the device can elect to transmit a duplicate message using the other transmission protocol.

As described herein, a controller device may be any type of computing device, such as a desktop computer, laptop computer, tablet computer, mobile phone, media player, smart television (TV) device, or wearable computing device, configured to provide one or more control instructions to another device. The control instructions may be generated by the controller device in response to user input (e.g., on a touch screen of the controller device or via voice recognition). In some cases, the control instructions sent to the other device are for controlling that other device. Controller devices may also receive control instructions intended for another device and may relay them to the other device.

As described herein, a resident device may also be any computing device that sends, receives, and/or relays control instructions as described above. However, in some examples, a resident device may be configured to remain on a local area network (e.g., within a home or at a specific location) and may be accessible from outside the local area network (e.g., outside the home, etc.). The resident device may monitor the local area network for control instructions from a controller device, which it may then relay to an accessory device. In some instances, resident devices may also act as controller devices, sending control instructions to other devices without relaying them. Just like controller devices, resident devices may generate control instructions in response to user input. In some instances, a router, Internet gateway, and/or wireless router may be configured as a resident device.

As described herein, an accessory device may include any device that may be controlled by a control instruction received from any computing device (e.g., a controller device or a resident device) or via user input. Examples of accessory devices include light fixtures, thermostats, door locks, automatic door openers (e.g., garage door openers), still or video cameras, and so on. Accessory devices, resident devices, and controller devices may communicate with each other via wired or wireless channels using any transport protocols such as Wi-Fi, Bluetooth, Bluetooth LE, Zigbee, Transmission Control Protocol/Internet Protocol (TCP/IP), or the like.

In a first illustrative example, consider a setting that corresponds to a home environment. The home environment may include one or more controller devices, which may also be resident devices (e.g., a smart speaker, a smart digital media player configured to control a TV, a tablet, etc.) of the home. A user may use a controller device to input a command (e.g., via a graphical user interface (GUI)) to have an accessory device (e.g., a smart thermostat) perform a function. The controller device may receive the command and translate the command into control instructions for the accessory device. The controller device may further generate a message identifier and include the message identifier with the control instructions as a message. The message identifier may be a unique identifier for the message, may have a specific format, and may be generated by an application executing on the controller device. The controller device may transmit the message to a resident device via a first transmission protocol. The controller device may further transmit a duplicate message to the resident device via a second transmission protocol.

The resident device may receive one or both messages from the controller device. The resident device may load the first received message into one or more communication interface registers. The resident device may further transmit the first received message to an accessory via the communication interface.

The resident device may later receive the other message of the two messages (e.g., the duplicated message) from the controller device. The resident device may further determine that the second received message is a duplicate of the first received message. Based on the order of receipt of the messages from the controller device, the resident device may determine that the first received message has lower latency than the second received message. The resident device may further deduplicate the second received message based on the latency. Additionally, the resident device may use this determination to identify the lowest latency transmission protocol for future communication with the controller device. Information identifying the lowest latency transmission protocol may be shared with the controller device, and the controller device may then be configured to optimize communications with the resident device based on this information.

FIG. 1 is a simplified block diagram 100 of an environment in which a device may transmit duplicated messages to another device, according to one or more embodiments. In FIG. 1, the example environment depicted includes a home environment 102. The home environment 102 may correspond to a defined (e.g., limited) area and/or structure (e.g., dwelling unit), whereby one or more user profiles (e.g., of family members, roommates, etc.) have some affiliation with the home environment 102. Each user profile that may be affiliated with the home environment 102 may also be affiliated with one or more devices (e.g., a smartwatch, mobile phone, tablet, etc.). For example, in FIG. 1, a user 104 may represent an affiliated user who has a user profile that may be associated with controller device 106 (e.g., a mobile phone). User 104 is depicted in FIG. 1 as within a particular zone 108 of the home environment 102 (e.g., signified by the vertical dividing line within the home space). In one example, a zone may correspond to a room or other suitable partition (e.g., a living room, kitchen, bedroom, office, etc.). While the environment described herein can be a home environment, the techniques described herein do not need to be limited to a "home," and may be implemented in other types of spaces (e.g., office buildings, public buildings, parks, etc.).

Within the home environment 102, there may be one or more controller devices (e.g., a tablet, a mobile device, a home automation device, or the like). In some embodiments, each resident device in the home environment 102 may be configured to perform the embodiments of the present disclosure. For example, a resident device in the home environment 102 may be configured to receive a message via a first transmission protocol. The resident device in the home environment 102 may further be configured to receive a duplicate message via a second transmission protocol. The resident device may further be configured to determine that the second received message is a duplicate of the first received message. Based on the order of receipt of the messages from the controller device, the resident device may determine that the first received message has lower latency than the second received message. The resident device can further transmit the first received message to an accessory. The resident device may further deduplicate the second received message based on the latency.

In the simplified home environment 102 of FIG. 1, a resident device 110 (e.g., a smart home controller) is depicted as a representative resident device that can be suitable for performing the embodiments described herein. In this example, the user 104 may be one of the affiliated users of the home environment 102 that are associated with the resident device 110. In some embodiments, as described herein, the resident device 110 may be communicatively connected to one or more other devices, each of which are also affiliated with the home environment 102. For example, the resident device 110 may be communicatively connected to one or more personal (e.g., user) devices and/or other resident devices. As described herein, in some embodiments, a user device (e.g., controller device 106, which may be a mobile device) or other resident device may be connected to the resident device 110 via a local area network (LAN) while within the home environment 102. In some embodiments, the controller device (e.g., the controller device 106) may also be connected to the resident device 110 via a wide area network (WAN).

In some embodiments, the user 104 may use a controller device 106 (e.g., mobile device) to input a command (e.g., via a GUI) to have an accessory device 112 (e.g., a smart thermostat) perform a function. The controller device 106 may receive the command and translate the command into control instructions for the accessory device 112. As suggested above, in some embodiments, the controller device 106 can initially determine whether to transmit the message via the first transmission protocol 114 and duplicate message via the second transmission protocol 116 prior to transmitting the message. In these embodiments, the controller device 106 communicates to the resident device via a default transmission protocol (e.g., either the first transmission protocol or the second transmission protocol). The controller device further includes a transport layer, an end-to-end providing protocols for communicating between two devices (e.g., the controller device 106 and the resident device 110). The transport layer can include monitoring latency for messages between the controller device 106 and the resident device 110 (e.g., a time in milliseconds between sending a signal and receiving a response). If the controller device 106 detects that the latency is acceptable (e.g., a threshold latency), the controller device 106 can continue to transmit messages to the resident device 110 via the default transmission protocol. If, however, the controller device 106 detects that the latency is unacceptable (e.g., above a threshold latency), the controller device 106 can elect to transmit the message via the first transmission protocol 114 and duplicate message via the second transmission protocol 116. The default transmission protocol may be statically selected. In other instances, the default transmission protocol can be dynamically selected. For example, the transport layer continuously monitors the latency differences between the transmission protocols. Based on the best-performing transmission protocol, the transport layer selects the best-performing transmission protocol as the default transmission protocol. It should be appreciated that as described herein, the resident device 110 and the accessory device 112 can also include embodiments in which the resident device 110 and the accessory device 112 can transmit messages via a default transmission protocol. The resident device 110 and the accessory device 112 can monitor latency between the devices. The resident device 110 and the accessory device 112 can further respectively elect to transmit the message via the first transmission protocol 114 and the duplicate message via the second transmission protocol 116 based on the latency. As described herein, in some embodiments, a device that transmits a message via a first transmission protocol and a duplicate message via a second transmission protocol can include the functionality to elect to transmit the message via the first transmission protocol and the duplicate message via the second transmission protocol. In other embodiments, the device that transmits a message via a first transmission protocol and a duplicate message via a second transmission protocol does not include this functionality. In these embodiments, the device defaults to transmitting the message via the first transmission protocol and the duplicate message via the second transmission protocol.

In this example, the controller device 106 can elect to transmit the message via the first transmission protocol 114 and the duplicate message via the second transmission protocol 116. The controller device 106 may further generate a message identifier and include the message identifier with the control instructions in the message. The controller device 106 may transmit the message to the resident device 110 via a first transmission protocol 114. The controller device 106 may further transmit a duplicate message to the resident device 110 via the second transmission protocol 116, which is different from the first transmission protocol 114.

The resident device 110 may receive the message from the controller device 106 via the first transmission protocol 114 and detect the message identifier generated by the controller device 106. The resident device 110 may perform a look-up in its local memory (e.g., cache) for previously stored message identifiers to determine whether there is a matching message identifier. If the resident device 110 does not detect a match, the resident device 110 may store the message identifier generated by the controller device 106 in memory. If the resident device 110 detects a matching message identifier, the resident device 110 may deduplicate the message received from the controller device 106 via the first transmission protocol 114. For illustration purposes, in this example and throughout this disclosure, a message via a first transmission protocol can be the first received message, and a duplicate message via a second transmission protocol can be the second received message (e.g., later in time). It should be appreciated that in real-world scenarios, either the original message or the duplicate message may be the first received message or the second received message. In other words, "first" and "second," as used with respect to transmission protocols and sent messages, are used to differentiate between the two messages and are not intended to imply a temporal order. On the other hand, "first" and "second," when used to refer to the order of receipt of the messages, may be used to determine which message had lower latency, which message was received sooner than the other, or the like.

The resident device 110 may determine that there is no matching message identifier in its local memory. By determining that there is no matching message identifier, the resident device 110 may determine that the message received via the first transmission protocol 114 has lower latency than any subsequently received duplicate message. In response to not detecting a matching message identifier, the resident device 110 may then transmit the message (e.g., a control instruction) to the accessory device 112 (e.g., the smart thermostat).

Additionally, in some instances, the resident device 110 may generate a new message identifier and transmit the message, including the message identifier generated by the resident device 110 and the message identifier generated by the controller device 106 to the accessory device 112 via one of the transmission protocol (e.g., via the LAN). In some other instances, the resident device 110 may also then transmit a duplicate message via the other transmission protocol (e.g., via the WAN). Each of the message and the duplicate message may include the same message identifier. In this respect, the resident device 110 may transmit the message to the accessory device 112 without having to wait until a duplicate message is received.

Upon receipt by the resident device 110, of a new message (e.g., the duplicate message) from the controller device 106 via the second transmission protocol 116, the resident device 110 may detect the message identifier generated by the controller device 106. The smart resident device 110 may perform a look-up of the stored message identifiers in its local memory (e.g., cache). Based on the look-up, the resident device 110 may determine whether a matching message identifier exists in the local memory. If a matching message identifier is stored in the memory, the resident device 110 may deduplicate the new message. If a matching message identifier is not stored in the memory, the resident device 110 may store the message identifier in the memory. As suggested above and as described in these examples, the new message (e.g., duplicate message) may be the second received message and therefore may be deduplicated.

In some instances, the accessory device 112 may receive the message via the first transmission protocol 118 from the resident device 110 and detect the message identifier generated by the resident device 110. The accessory device 112 may perform a look-up in its local memory (e.g., cache) for previously stored message identifiers to determine whether there is a matching message identifier. If the accessory device 112 does not detect a match, the accessory device 112 may store the message identifier in memory and execute the control instructions. If the accessory device 112 detects a matching message identifier, the accessory device 112 may deduplicate the message received from the resident device 110.

In this example, the accessory device 112 may not detect a matching message identifier and may execute the control instructions. Upon execution of the instructions and in some instances, the accessory device 112 may generate a new message identifier and transmit a response to the resident device 110 via the first transmission protocol 118. The response may include the message identifier generated by the controller device, the message identifier generated by the accessory device 112, and a state of the accessory device 112 (e.g., if the accessory device is a smart thermostat, the states can include a cooling state, warming state, current temperature, etc.). By including each message identifier, a subsequent device (e.g., the resident device 110, controller device 106) can determine whether a duplicate response has been sent using the message identifier generated by the accessory device 112; and match the response to the originally sent message using the message identifier generated by the controller device 106. The accessory device 112 may further transmit a duplicate response to the resident device 110 via the second transmission protocol 120. It should be appreciated that in some instances, an accessory device can communicate with a resident device through a single transmission protocol and does not send a duplicate message via another transmission protocol.

Upon receipt of a new message (e.g., the duplicate message), the accessory device 112 may detect the message identifier generated by the resident device 110. The accessory device 112 may perform a look-up of the stored message identifiers in memory (e.g., cache). Based on the look-up, the accessory device 112 may determine whether a matching message identifier is stored in the memory. If a matching message identifier is stored in the memory, the accessory device 112 may deduplicate the new message. If a matching message identifier is not stored in memory, the accessory device 112 may store the message identifier in the cache. As suggested above, in this example, the accessory device 112 does detect a matching message identifier and deduplicates the new message (e.g., duplicate message) from the resident device 110.

The resident device 110 may receive the response from the accessory device 112 via the first transmission protocol 118 and detect the message identifier generated by the accessory device 112. The resident device 110 may perform a look-up in the memory to determine whether a matching message identifier is stored in the memory. In this example, the resident device 110 determines that a matching identifier is not stored in memory and may store the message identifier. The resident device 110 can further match the message from the controller device 106 to the response via the message identifier generated by the controller device 106. The resident device 110 may generate a new message identifier for the response and transmit the response, including the new message identifier generated by the resident device 110 and the message identifier generated by the controller device 106 to the controller device 106 via the first transmission protocol 114. The resident device 110 can further transmit a duplicate response via the second transmission protocol 116. In this respect, the resident device 110 may transmit the response to the controller device 106 without having to wait until a duplicate response is received.

Upon receipt of a new response (e.g., duplicate response) from the accessory device 112 via the second transmission protocol 120, the resident device 110 may detect the message identifier generated by the accessory device 112. The resident device 110 may perform a look-up of the stored message identifiers in the memory. Based on the look-up, the resident device 110 may determine whether a matching message identifier is stored in the memory. As suggested above, the resident device 110 detects a matching message identifier and deduplicates the new response from the accessory device 112.

The controller device 106 may receive the response via the first transmission protocol 114 from the resident device 110 and detect the message identifier generated by the resident device 110. The controller device 106 can perform a look-up in memory (e.g., cache) to determine whether a matching message identifier is stored in the memory. In this example, the controller device 106 can determine that a matching identifier is not stored in memory and may store the message identifier in memory. The controller device 106 can further match the response to an original message based on the message identifier generated by the controller device 106. In some embodiments, the controller device 106 translates the state of the accessory into display instructions for displaying on the GUI. In this respect, the controller device 106 may generate the display instructions without having to wait until a duplicate response is received.

Upon receipt of a new response from the resident device 110 (e.g., the duplicate response) via the second transmission protocol 116, the controller device 106 may detect the message identifier generated by the resident device 110. The controller device 106 may perform a look-up of the stored message identifiers in the memory to determine whether a matching message identifier is stored in memory. As suggested above, in this example, the controller device 106 does detect a matching message identifier and deduplicates the new response (e.g., the duplicate response).

Figure 2:
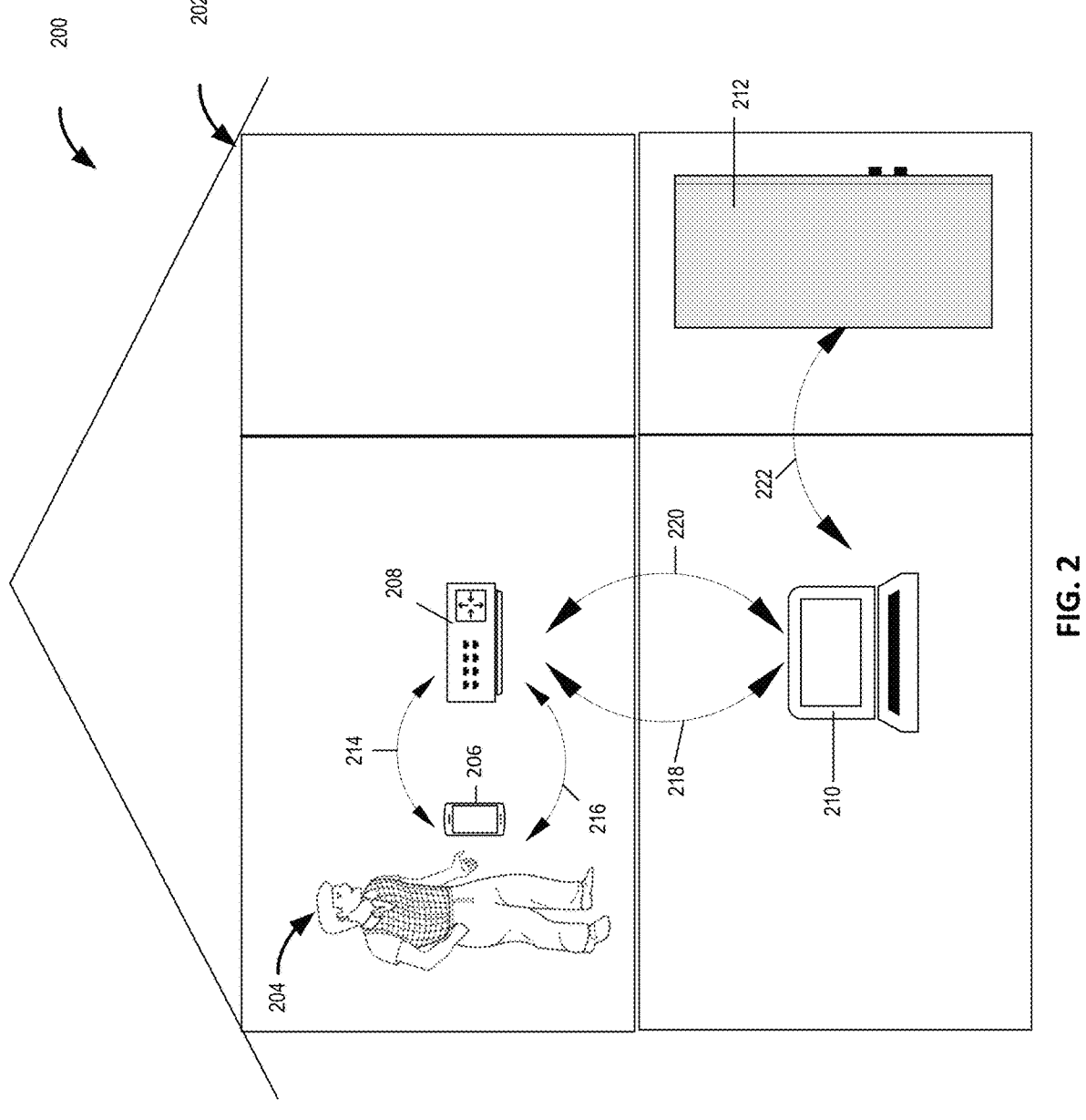
FIG. 2 is a simplified block diagram of an environment in which a device may transmit duplicated messages to another device, according to one or more embodiments.

FIG. 2 is a simplified block diagram 200 of an environment in which a device may transmit duplicated messages to another device, according to one or more embodiments. In this illustrative example, consider another setting in which a controller device communicates with a first resident device, which can communicate with a second resident device. The second resident device can communicate with an accessory. This setting may arise where a user is physically located at an edge of a local network, or when an accessory is located at an edge of the local network, such that the controller device needs to relay a command via two resident devices to reach the accessory device.

In FIG. 2, the example environment depicted includes a home environment 202. A user 204 may use their controller device 206 (controller) to input a command (e.g., via a GUI) to an accessory device 212 (e.g., smart refrigerator). The controller device 206 may receive the command and translate the command into a message, including control instructions, for the accessory device 212. The home environment 202 may include a first resident device 208 (e.g., a router) and a second resident device 210 (e.g., a personal computer). The controller device 206 may further generate a message identifier and include the message identifier with the control instructions. The controller device 206 may be out of range of the second resident device 210, and therefore, the controller device 206 may transmit the message to the first resident device 208 via a first transmission protocol 214, such as a LAN. The controller device 206 may further transmit a duplicate message to the first resident device 208 via a second transmission protocol 216, such as a WAN.

The first resident device 208 may receive the message via the first transmission protocol 214 from the controller device 206 and detect the message identifier generated by the controller device 206. The first resident device 208 may perform a look-up in local memory (e.g., cache) to determine whether a matching message identifier has previously been stored in the memory. As suggested above, in this example, the first resident device 208 does not detect a matching message identifier. The first resident device 208 generates a new message identifier and transmits the message, including the message identifier generated by the controller device 206 and the message identifier generated by the first resident device 208, to the second resident device 210 via a first transmission protocol 218. The first transmission protocol 218 may be the same as the first transmission protocol 214 used by the controller device 206. The first resident device 208 further stores the message identifier generated by the controller device 206 in memory. The first resident device 208 further transmits a duplicate message to the second resident device 210 via a second transmission protocol 220. The second transmission protocol 220 may be the same as the second transmission protocol 216 used by the controller device 206. In this respect, the first resident device 208 may transmit the message to the second resident device 210 without having to wait until a duplicate message is received.

Upon receipt of a new message via the second transmission protocol 216 (e.g., the duplicate message) from the controller device 206, the first resident device 208 may detect the message identifier generated by the controller device 206. The first resident device 208 may further perform a look-up of the stored message identifiers in the memory to determine whether a matching message identifier is stored. Based on the look-up, the first resident device 208 may determine whether a matching message identifier exists in the memory. As suggested above, in this example, the first resident device 208 does detect a matching message identifier and deduplicates the new message from the controller device 206.

The second resident device 210 may receive the message from the first resident device 208 via the first transmission protocol 218 and detect the message identifier generated by the first resident device 208. The second resident device 210 may further perform a look-up of the stored message identifiers in local memory (e.g., cache) to determine whether a matching message identifier is stored. As suggested above, in this example, the second resident device 210 does not detect a matching message identifier. The second resident device 210 transmits the message, including the message identifier generated by the controller device 206, to the accessory device 212 via a first transmission protocol 222. The first transmission protocol 222 may be the same as the first transmission protocol 214 used by the controller device

206, and the first transmission protocol 218 used by the first resident device 208. The second resident device 210 further stores the message identifier generated by the first resident device 208 in the memory. In this example, the second resident device 210 communicates with the accessory device 212 via the first transmission protocol 222.

Upon receipt of a new message via the second transmission protocol 220 (e.g., the duplicate message) from the first resident device 208, the second resident device 210 may detect the message identifier generated by the first resident device 208. The second resident device 210 may further perform a look-up of the stored message identifiers in memory (e.g., cache) to determine whether a matching message identifier is stored. As suggested above, in this example, the second resident device 210 detects a matching message identifier and deduplicates the new message from the first resident device 208.

The accessory device 212 may receive the message from the second resident device 210 via the first transmission protocol 222. The accessory device 212 may then execute the control instructions included in the message. The accessory device 212 then transmits a response to the second resident device 210 via the first transmission protocol 222.

The second resident device 210 may receive the response from the accessory device 212. The second resident device 210 then generates a new message identifier and transmits the response, including the new message identifier generated by the second resident device 210 and the message identifier generated by the controller device 206, to the first resident device 208 via the first transmission protocol 218. The second resident device 210 further transmits a duplicate message to the first resident device 208 via the second transmission protocol 220.

The first resident device 208 may receive the response from the second resident device 210 via the first transmission protocol 218 and detect the message identifier generated by the second resident device 210. The first resident device 208 may further perform a look-up of the stored message identifiers in memory (e.g., cache) to determine whether a matching message identifier is stored. As suggested above, in this example, the first resident device 208 does not detect a matching message identifier. The first resident device further matches the original message from the controller device 206 to the response from the accessory device 212 based on the message identifier generated by the controller device 206. The first resident device 208 then generates a new message identifier and transmits the response, including the new message identifier generated by the first resident device and message identifier generated by the controller device to the controller device 206 via the first transmission protocol 214. The first resident device 208 further stores the message identifier generated by the second resident device 210 in the memory. The first resident device 208 further transmits a duplicate message to the controller device 206 via the second transmission protocol 216. In this respect, the first resident device 208 may execute the control instructions and transmit the response to the controller device 206 without having to wait until a duplicate response is received.

Upon receipt of a new response from the second resident device 210 via the second transmission protocol 220 (e.g., the duplicate response), the first resident device 208 may detect the message identifier generated by the second resident device 210. The first resident device 208 may further perform a look-up of the stored message identifiers in memory (e.g., cache) to determine whether a matching message identifier is stored. As suggested above, in this example, the first resident device 208 detects a matching message identifier and deduplicates the new response from the second resident device 210.

The controller device 206 may receive the response from the first resident device 208 via the first transmission protocol 214. The controller device 106 may further detect the message identifier in the response. The controller device 206 performs a look-up in memory (e.g., cache) to determine whether a matching message identifier is stored in the memory. As suggested above, in this example, the controller device 206 determines that a matching identifier is not stored in memory and may store the message identifier in memory. In some embodiments, the controller device 106 translates the state of the accessory device 212 into display instructions for displaying on the GUI. In this respect, the controller device 206 may generate the display instructions without having to wait until a duplicate response is received.

Upon receipt of a new response from the first resident device 208 (e.g., the duplicate response) via the second transmission protocol 216, the controller device 206 may detect the message identifier in the response generated by the first resident device 208. The mobile device may perform a look-up of the stored message identifiers in the memory to determine whether a matching message identifier is stored in memory. As suggested above, in this example, the controller device 206 does detect a matching message identifier and deduplicates the new response from the first resident device 208.

Figure 3:
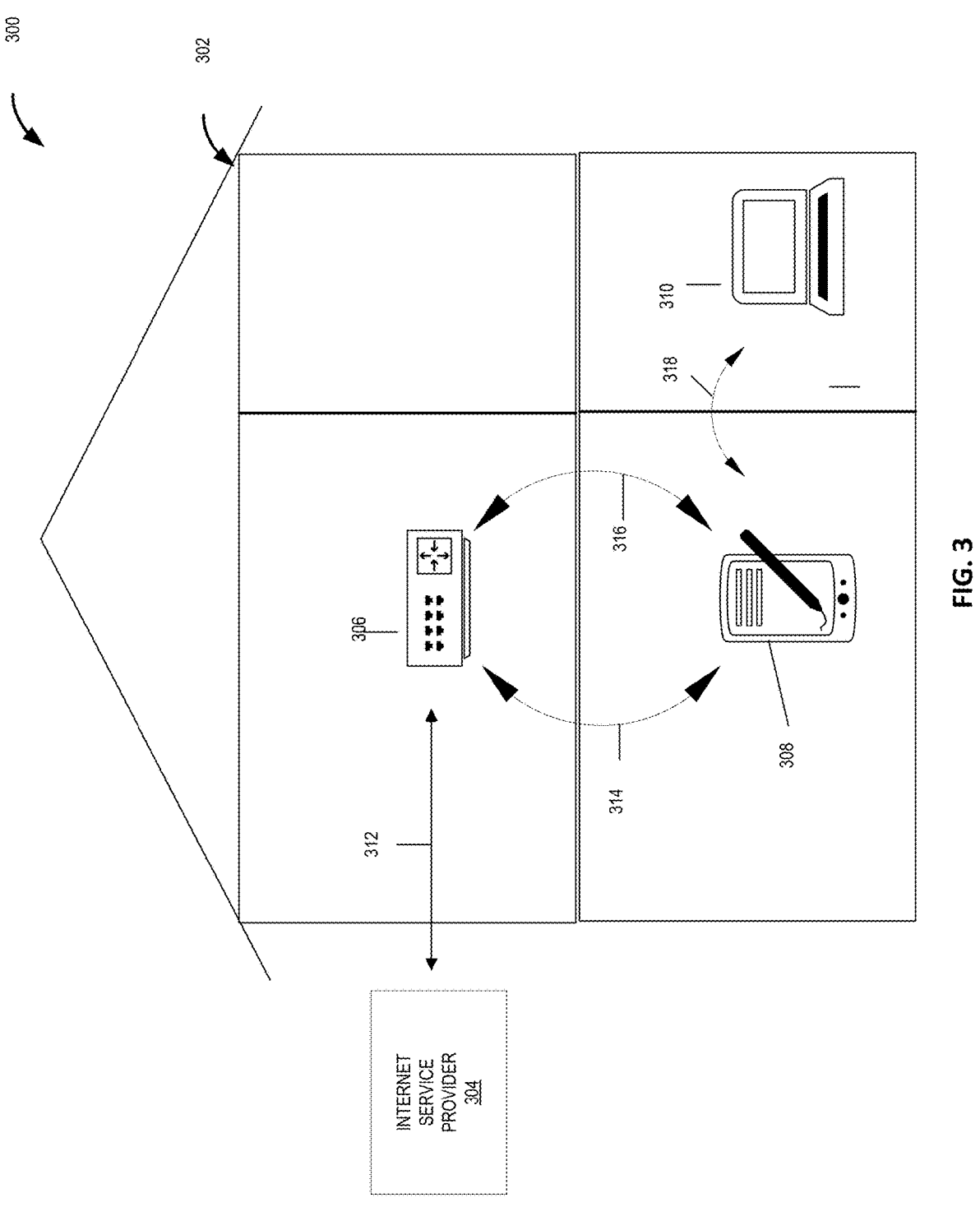
FIG. 3 is a simplified block diagram of an environment in which a device may transmit duplicated messages to another device, according to one or more embodiments.

FIG. 3 is a simplified block diagram 300 of an environment in which a device may transmit duplicated messages to another device, according to one or more embodiments. In a third illustrative example, consider a controller that transmits a message to a first resident device, the first resident device transmits the message to a second resident device, and the second resident device transmits the message to an accessory device. In this example, the controller device can be a third party server such as from an internet service provider (ISP). This setting may arise where the third party provides a service for the accessory device. For example, a user may communicate with the third party service (e.g., via an application programming interface (API)) to request an accessory update (e.g., turning a light on or off). In response to the request, the third party service may send the control instruction to the light in the home environment via the ISP. In other examples, the ISP may perform a wellness check on the networking performance of the accessory device.

In FIG. 3, the example environment depicted includes a home environment 302. The internet service provider (ISP) 304 transmits a message to a first resident device 306 via a first transmission protocol 314, such as a WAN. The message may include control instructions and a message identifier.

The first resident device 306 (e.g., a router) may receive the message from the internet service provider 304 via the first transmission protocol 312. The first resident device 306 may generate a message identifier and transmit the message, including the message identifier generated by the internet service provider 304 and the message identifier generated by the first resident device 306, to the second resident device 308 (e.g., mobile device) via a first transmission protocol 314. The first transmission protocol 314 may be the same as the first transmission protocol 312 used by the internet service provider 304. The first resident device 306 further transmits a duplicate message to the second resident device 308 via a second transmission protocol 220 (e.g., LAN).

The second resident device 308 may receive the message via the first transmission protocol 314 from the first resident device 306 and detect the message identifier generated by the first resident device 306. The second resident device 308 may further perform a look-up of the stored message identifiers in memory (e.g., cache) to determine whether a matching message identifier is stored. As suggested above, in this example, the second resident device 308 does not detect a matching message identifier. The second resident device 308 transmits the message to the accessory device 310 (e.g., accessory device) via a first transmission protocol 318. The first transmission protocol 318 may be the same as the first transmission protocol 312 used by the internet service provider 304, and the first transmission protocol 314 used by the first resident device 306. The second resident device 308 can further store the message identifier generated by the first resident device 306 in the memory. In this respect, the second resident device 308 may transmit the message to the accessory device 310, without having to wait until a duplicate message is received. In this example, the second resident device communicates with the accessory device 310 via a single transmission protocol and does not duplicate the message.

Upon receipt of a new message from the first resident device 306 via the second transmission protocol 316 (e.g., the duplicate message), the second resident device 308 may detect the message identifier generated by the first resident device 306. The second resident device 308 may further perform a look-up of the stored message identifiers in memory (e.g., cache) to determine whether a matching message identifier is stored. As suggested above, in this example, the second resident device 308 detects a matching message identifier and deduplicates the new message from the first resident device 306.

The accessory device 310 may receive the message via the first transmission protocol 318 from the second resident device 308 and detect the message identifier and execute the control instructions from the internet service provider 304. The accessory device 310 then transmits the response, including the accessory state, to the second resident device 308 via the first transmission protocol 318.

The second resident device 308 may receive the response from the accessory device 310 via the first transmission protocol 318 and detect the message identifier. The second resident device 308 then generates a new message identifier and transmits the response, including the new message identifier generated by the second resident device 308 and message identifier generated by the internet service provider 304, to the first resident device 306 via the first transmission protocol 314. The second resident device 308 may further transmit a duplicate response to the first resident device 306 via the second transmission protocol 316.

The first resident device 306 may receive the response from the second resident device 308 via the first transmission protocol 314. The first resident device 306 may further perform a look-up of the stored message identifiers in memory (e.g., cache) to determine whether a matching message identifier is stored. The first resident device 306 can further match the original message sent by the internet service provider 304 to the response from the accessory device 310 based on the message identifier generated by the internet service provider 304. As suggested above, in this example, the first resident device 306 does not detect a matching message identifier. The first resident device 306 can then transmit the response to the internet service provider 304 via the first transmission protocol 312. The first resident device 306 can further store the message identifier generated by the second resident device 308 in memory. In this respect, the first resident device 306 may transmit the response to the internet service provider 304, without having to wait until a duplicate response is received.

Upon receipt of a new response from the second resident device 308 via the second transmission protocol 316 (e.g., the duplicate response), the first resident device 306 may detect the message identifier generated by the second resident device 308. The first resident device 306 may further perform a look-up of the stored message identifiers in memory (e.g., cache) to determine whether a matching message identifier is stored. As suggested above, in this example, the first resident device 306 detects a matching message identifier and deduplicates the new response from the second resident device 308.

Figure 4:
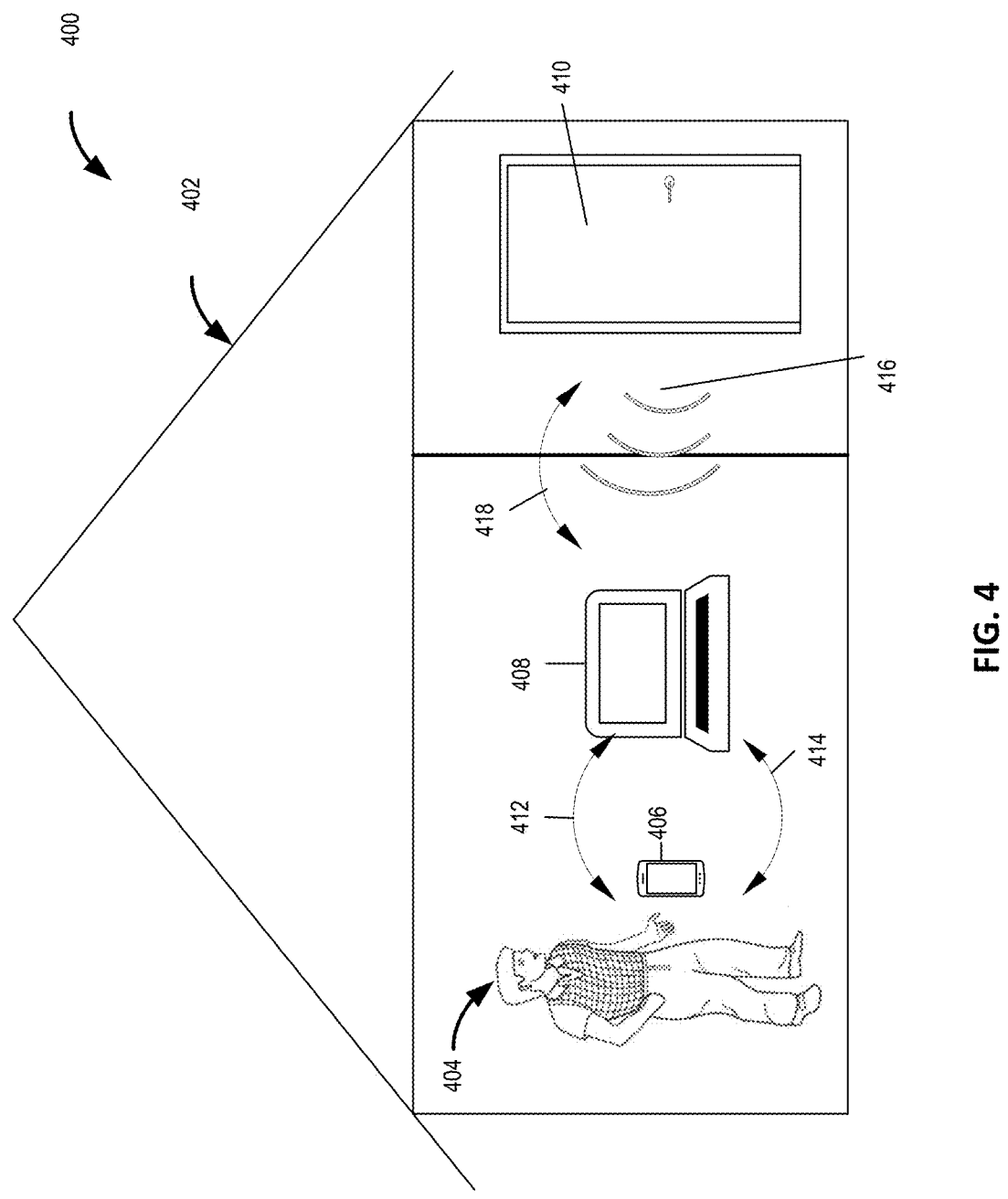
FIG. 4 is a simplified block diagram of an environment in which a device may transmit duplicated messages to another device, according to one or more embodiments.

FIG. 4 is a simplified block diagram 400 of an environment in which a device may transmit duplicated messages to another device, according to one or more embodiments. In a fourth illustrative example, consider another setting in which a controller communicates with a resident device, which communicates with an accessory device. In this fourth example, the accessory device broadcasts a current state to each other device in the home environment. Each other device stores the current state of the accessory device. In response to receiving control instructions from the controller device, the resident device compares the desired state of the accessory device to the stored current state of the accessory device. The resident device then elects whether to send the control instructions to the accessory device based on the comparison.

In FIG. 4, the example environment depicted includes a home environment 402. A user 404 may use their controller device 406 (e.g., mobile device) to input a command (e.g., via a GUI) to control an accessory device 410 (e.g., a smart door). The controller device 406 may receive the command and translate the command into a message, including control instructions, for the accessory device 410. The controller device 406 may further generate a message identifier and include the message identifier with the message. The controller device 406 may transmit the message via a first transmission protocol 412 to a resident device 408 (e.g., a personal computer). The controller device 406 may further transmit a duplicate message to the resident device 408 via a second transmission protocol 414.

The resident device 408 may receive the message from the controller device 406 via the first transmission protocol 412 and detect the message identifier generated by the controller device 406. The resident device 408 may further perform a look-up of the stored message identifiers in memory (e.g., cache) to determine whether a matching message identifier is stored. As suggested above, in this example, the resident device 408 does not detect a matching message identifier.

The resident device 408 then determines whether to transmit the message to the accessory device 410. The accessory device 410 can continuously broadcast a current state of the accessory device (e.g., open state, closed state, locked state, unlocked state) to each resident device in the home environment 402. Each resident device, including the resident device 408, can store the current state of the accessory device 410 in local memory (e.g., cache). The resident device 408 can include logic to determine whether the desired state of the accessory device 410 as per the control instructions from the controller device 406, matches the current state of the accessory device 410. The resident device 408 translates the control instructions into a desired state. For example, the resident device 408 may use a table that associates control instructions with desired states. The resident device 408 can then compares the desired state to the stored current state of the accessory device 410. If the desired state of the accessory device 410 matches the current state of the accessory device 410, the resident device 408 can determine not to send the message to the accessory device 410. If, however, the desired state of the accessory device 410 does not match the current state of the smart door 401, the resident device 408 can determine to send the message to the accessory device 410.

If the resident device 408 determines to send the message, the resident device 408 generates a new message identifier and transmits the message, including the message identifier generated by the resident device 408 and the message identifier generated by the controller device 406, to the accessory device 410 via a first transmission protocol 418. The first transmission protocol 418 may be the same as the first transmission protocol 412 used by the controller device 406. The resident device 408 further stores the message identifier generated by the controller device 406 in the memory. In this respect, the resident device 408 may determine whether to send the message and transmit the message to the accessory device 410 without having to wait until a duplicate message is received. In this example, the resident device 408 can communicate with the accessory device 410 via a single transmission protocol and does not send a duplicate message.

Upon receipt of a new message (e.g., the duplicate message) from the controller device 406 via the second transmission protocol 414, the resident device 408 may detect the message identifier generated by the controller device 406. The resident device 408 may further perform a look-up of the stored message identifiers in memory (e.g., cache) to determine whether a matching message identifier is stored. As suggested above, in this example, the resident device 408 detects a matching message identifier. In this scenario, whether the resident device 408 detects a matching message identifier or had determined not to transmit the message, the resident device 408 deduplicates the new message from controller device 406.

The accessory device 410 may receive the message from the resident device 408 via the first transmission protocol 418. The accessory device 410 may execute the control instructions from the controller device 406. The accessory device 410 then transmits the response to the resident device 408 via the first transmission protocol 418. The response includes the message identifier generated by the controller device 406 and a state of the accessory device 410 upon executing the control instructions.

The resident device 408 may receive the response from the accessory device 410 via the first transmission protocol 418. The resident device can match the original message from the controller device 406 to the response from the accessory device 410 based on the message identifier generated by the controller device 406. The resident device 408 can then generate a new message identifier and transmits the response, including the new message identifier generated by the resident device 408 and the message identifier generated by the controller device 406, to the controller device 406 via the first transmission protocol 412. The resident device 408 can further transmit a duplicate message to the controller device 406 via the second transmission protocol 414.

The controller device 406 may receive the response from the resident device 408 via the first transmission protocol 412. The controller device 406 may further detect the message identifier in the response. The controller device 406 performs a look-up in memory (e.g., cache) to determine whether a matching message identifier is stored in the memory. As suggested above, in this example, the controller device 406 determines that a matching identifier is not stored in memory and may store the message identifier generated by the resident device 408 in memory. In some embodiments, the controller device 406 translates the state of the accessory device 410 into display instructions for displaying on the GUI. In this respect, the controller device 406 may store and generate the display instructions without having to wait until a duplicate response is received.

Upon receipt of a new response from the resident device 408 (e.g., the duplicate response) via the second transmission protocol 414, the controller device 406 may detect the message identifier generated by the resident device 408. The controller device 406 may perform a look-up of the stored message identifiers in memory to determine whether a matching message identifier is stored in memory. As suggested above, in this example, the controller device 406 does detect a matching message identifier and deduplicates the new response from the resident device 408 (e.g., the duplicate response).

FIG. 5 is a process flow 500 of deduplication, according to one or more embodiments. The operations of processes 500, 600, 700, and 800 may be performed by any suitable computing device (e.g., a user device, a server device, a controller device, a resident device, accessory device, or the like) may be used to perform one or more operations of these processes. Processes 500, 600, 700, and 800 (described below) are respectively illustrated as logical flow diagrams, each operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

At 502, a device may receive a message that includes control instructions for an accessory and a message identifier. The control instructions may direct the accessory device to perform or desist from performing some action. The message identifier is a unique identifier associated with the message. The message may be received from a controller device or another device. The message may further be received via a first transmission protocol (e.g., LAN, WAN).

At 504, the device may determine whether a duplicate message has been previously received by the device. The duplicate message may be received from either the controller device or the other device, but the same device that transmitted the message described at 502. The duplicate message may further have been received via a second transmission protocol (e.g., LAN, WAN) distinct from the first transmission protocol. The device may apply various methods to determine whether a duplicate message has been previously received by the device. One exemplary method for determining whether a duplicate message has previously been received is described with respect to FIG. 6.

At 506, if the device may determine that a duplicate message has previously been received, the device deduplicates the message received at 502. Deduplication includes deleting the message or storing the message for processing later. At 508, if the device determines that a duplicate message has not been received, the device may generate a new message identifier for the message.

At 510, the device may transmit the message, including the new message identifier, to another device via the first transmission protocol. The other device may be another device or the accessory device. The first transmission protocol may be the same transmission protocol used to send the message at 502. At 512, the device may transmit a duplicate of the message to the other device via a second transmission protocol. The second transmission protocol may be the same second transmission protocol described with respect to 504.

FIG. 6 is a process flow 600 for determining whether a duplicate message has previously been received, according to one or more embodiments. At 602, a device may receive a message that includes control instructions for an accessory and a message identifier. The control instructions may direct the accessory device to perform or desist from performing some action. The message identifier is a unique identifier associated with the message. The message may be received from a controller device or another device. The message may further be received via a first transmission protocol (e.g., LAN, WAN).

At 604, the device may detect the message identifier in the message. The message identifier may be formatted by the transmitting device such that the message identifier is identifiable by the device. At 606, the device may determine whether the message is a duplicate of a previously received message. In some embodiments, the device stores message identifiers from previously received messages in local memory (e.g., cache). The device may compare the message identifier from the message to stored message identifiers from the previously received messages.

If the device matches the message identifier of the message with a previously stored message identifier, the device may determine that the message is a duplicate. The device may further determine that the previously received message is transmitted on a transmission protocol that has lower latency than the transmission protocol used to transmit the message. At 608, the device may deduplicate the message. Deduplication includes deleting the message or storing the message for processing later. If, however, the device is unable to match the message identifier of the message with a previously stored message identifier, the device may determine that the message is not a duplicate. The device may further determine that the message is transmitted on a transmission protocol that has lower latency than a transmission protocol used to transmit a later received duplicate message. At 610, the device may store the message identifier of the message in local memory. The device may then generate a new message identifier and transmit the message to another device via a first transmission protocol. The device may further transmit a duplicate of the message via a second transmission protocol.

Figure 7:
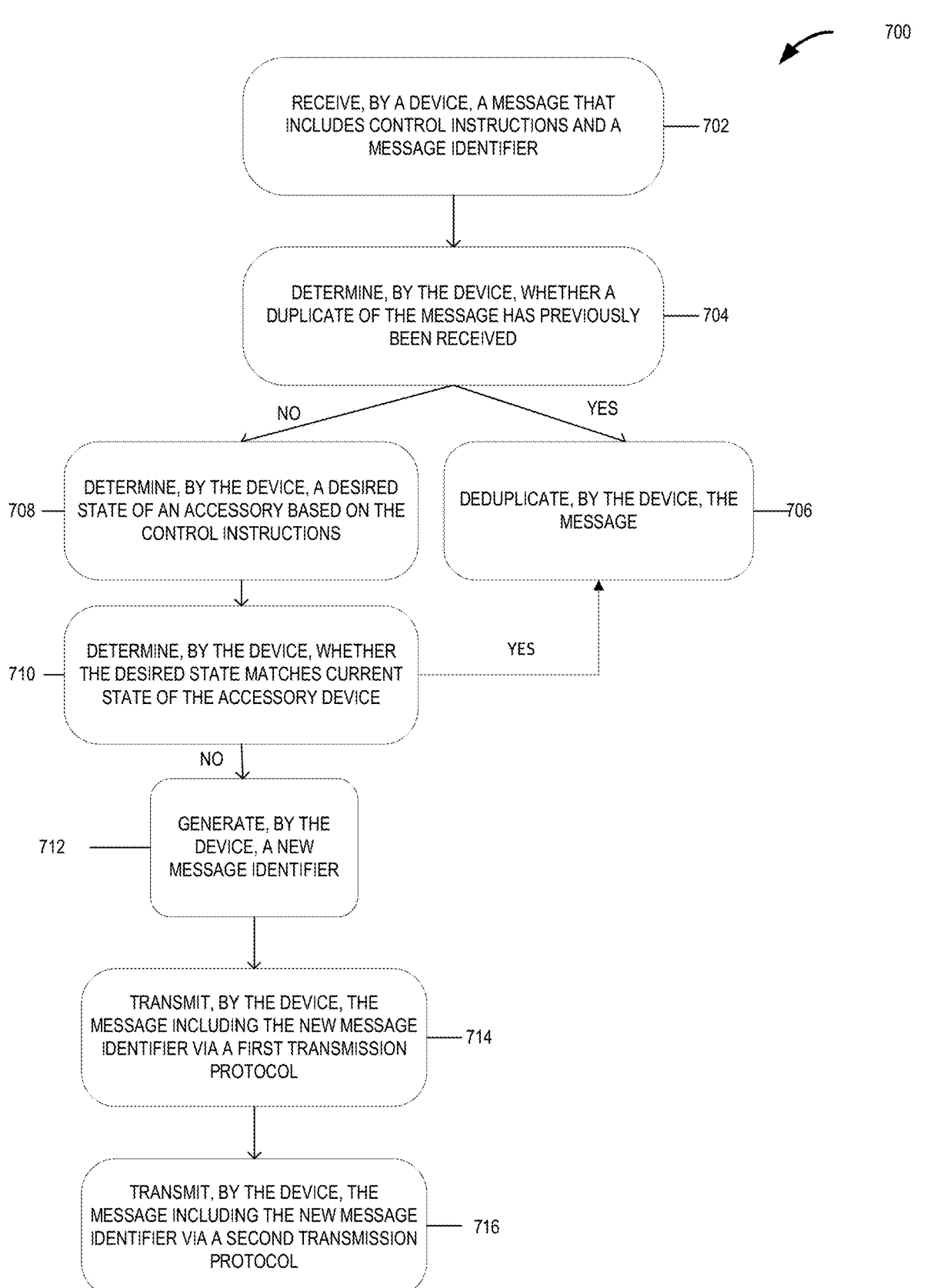
FIG. 7 is a process flow for determining whether to transmit a message to an accessory device, according to one or more embodiments

FIG. 7 is a process flow 700 for determining whether to transmit a message to an accessory device, according to one or more embodiments. At 702, a device may receive a message that includes control instructions for an accessory and a message identifier. The control instructions may direct the accessory device to perform or desist from performing some action. The message identifier is a unique identifier associated with the message. The message may be received from a controller device or another device. The message may further be received via a first transmission protocol (e.g., LAN, WAN).

At 704, the device may determine whether a duplicate message has been previously received by the device. The duplicate message may be received from either the controller device or the other device, but the same device that transmitted the message at 702. The duplicate message may further have been received via a second transmission protocol (e.g., LAN, WAN) distinct from the first transmission protocol. The device may apply various methods to determine whether a duplicate message has been previously received by the device. One exemplary method for determining whether a duplicate message has previously been received has been described with respect to FIG. 6.

At 706, if the device determines that a duplicate message has previously been received, the device may deduplicate the message received at 702. Deduplication includes deleting the message or storing the message for processing later. If, however, the device determines that a duplicate message has not been previously received, the method proceeds to 708. At 708, the device may determine a desired state of the accessory device based on the control instructions. In some embodiments, the device includes logic that compares the control instructions to stored controlled instructions in a table. The table associates the stored control instructions with desired accessory states. Based on the table, the device determines the desired state of the accessory device.

At 710, the device may determine whether the desired state of the accessory device matches the current state of the accessory device. In some embodiments, the accessory device may continuously broadcast its current state to each device in a home environment. Each device in the home environment may store the current state of the accessory device in local memory. The device may compare the desired state of the accessory device, as indicated by the table, to the stored current state of the accessory device.

If the desired state of the accessory device matches the stored current state of the accessory device, the device may determine not to send the message and deduplicates the message at 706. If, however, the desired state of the accessory device does not match the stored current state of the accessory device, the device may determine to transmit the message. The device may further generate a new message identifier for the message at 712.

At 714, the device may transmit the message, including the new message identifier, to the accessory device via the first transmission protocol. At 716, the device may transmit a duplicate of the message to the accessory device via the second transmission protocol FIG. 8 is a process flow 800 for receiving duplicate messages, according to one or more embodiments. At 802, the method can include a first device can receiving a first message from a second device using a first transmission protocol, the first message can include a first control instruction for an accessory device and a first message identifier. The first device can be for example, a resident device such as a smart speaker. The second device can be, for example, a controller device, such as a smart phone. The accessory device can be, for example, a controllable accessory device such as a thermostat, speaker, garage door or other appropriate accessory device. The control instruction can indicate a desired state of the accessory device, such as on/off, volume level, content source, or other appropriate state. The first transmission protocol can be, for example, Wi-Fi. In some instances, the second device can have a poor signal quality when transmitting and receiving messages using the first transmission protocol. For example, the second device can be located at the edge of a network. Therefore, to ensure that the first device has received the control instruction, the second device can transmit a duplicate message using a second transmission protocol, such as cellular. The duplicate message can include the same message identifier and control instruction.

At 804, the method can include the first device transmitting, by using the first transmission protocol, a second message to the accessory device, the second message comprising the first control instruction and a second message identifier. The first device can determine which accessory is to receive the control instruction, generate a new message identifier (e.g., the second message identifier), and transmit a new message (e.g., the second message) to the accessory device). In this sense, the accessory device can receive control instructions from the resident device, rather than directly from a controller device. Similar to the second device, the first device can also transmit a duplicate message to the accessory device using the second transmission protocol.

At 806, the method can include the first device receiving a third message from the second device using a second transmission protocol, the second message comprising a second control instruction for the accessory device and a third message identifier. At this point, the first device can be unaware as to whether the third message is the duplicate of the first message or another message with another control instruction.

At 808, the method can include the first device comparing the third message identifier with the first message identifier to determine whether the second control instruction is a duplicate of the first control instruction. For example, the first device can have stored the first message identifier in local memory. Upon receipt of the third message, the first device can perform a lookup in memory to determine whether the third message identifier is a duplicate of the first message identifier or different than the first message identifier.

At 810, the method can include the first device determining whether to transmit the third message to the accessory device based at least in part on the comparison. For example, if the third message identifier is a duplicate of the first message identifier, the first device can determine that the third message is a duplicate of the first message. The first device can further deduplicate the third message. Deduplication can include deleting the third message or storing the third message for processing later. If, however, the third message identifier is different than the first message identifier, the first device can determine that the third message is a new control instruction for the accessory device and transmit the third instruction to the accessory device. In some instances, the first device can generate a new message identifier and transmit the third message using the first transmission protocol and a duplicate of the third message using the second transmission protocol.

Embodiments described herein may be implemented in electronic devices that may be of generally conventional design and adapted to conform to a universal accessory protocol to support command and control operations by which a controller (a first electronic device) may control the operation of an accessory (a second electronic device).

Figure 9:
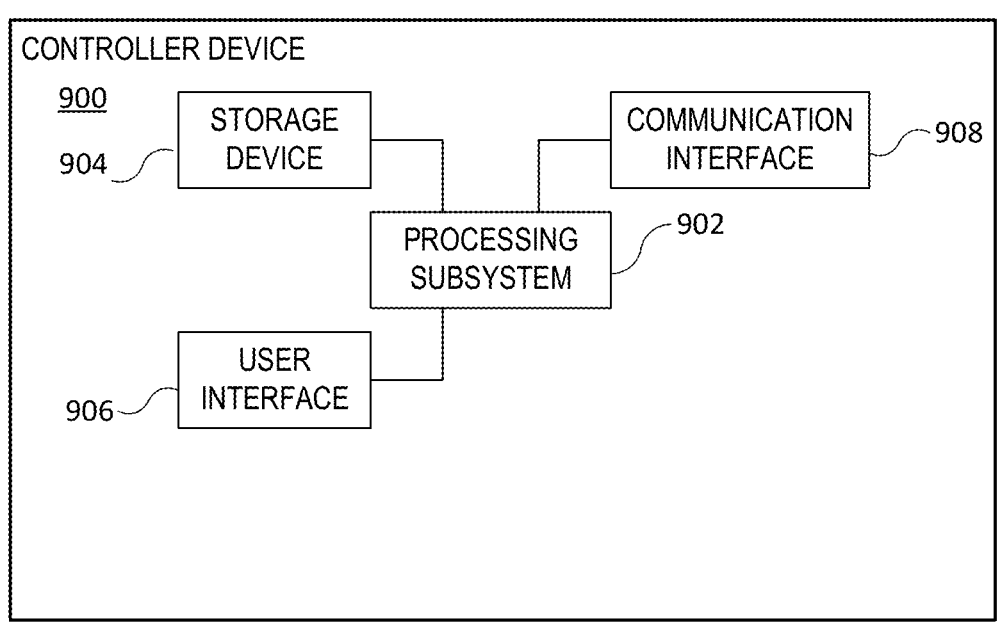
FIG. 9 is a simplified block diagram of a controller device, according to one or more embodiments.

FIG. 9 is a simplified block diagram of a controller device 900 according to one or more embodiments. Controller device 900 may implement any or all of the controller functions, behaviors, and capabilities described herein, as well as other functions, behaviors, and capabilities not expressly described. Controller device 900 may include processing subsystem 902, storage device 904, user interface 906, communication interface 908. Controller device 900 may also include other components (not explicitly shown)

such as a battery, power controllers, and other components operable to provide various enhanced capabilities. In various embodiments, controller device 900 may be implemented in a desktop computer, laptop computer, tablet computer, smart phone, wearable computing device, or other systems having any desired form factor. Further, as noted above, controller device 900 may be implemented partly in a base station and partly in a mobile unit that communicates with the base station and provides a user interface.

Storage device 904 may be implemented, e.g., using disk, flash memory, or any other non-transitory storage medium, or a combination of media, and may include volatile and/or nonvolatile media. In some embodiments, storage device 904 may store one or more application and/or operating system programs to be executed by processing subsystem 902, including programs to implement various operations described above as being performed by a controller. For example, storage device 904 may store a universal controller application that may read an accessory description record and generate a graphical user interface for controlling the accessory based on information therein. In some embodiments, portions (or all) of the controller functionality described herein may be implemented in operating system programs rather than applications. In some embodiments, storage device 904 may also store apps designed for specific accessories or specific categories of accessories (e.g., an IP camera app to manage an IP camera accessory or a security app to interact with door lock accessories).

User interface 906 may include input devices such as a touchpad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital converters, signal processors, or the like). A user may operate input devices of user interface 906 to invoke the functionality of controller device 900 and may view and/or hear output from controller device 900 via output devices of user interface 906.

Processing subsystem 902 may be implemented as one or more integrated circuits, e.g., one or more single core or multi core microprocessors or microcontrollers, examples of which are known in the art. In operation, processing system 902 may control the operation of controller device 900. In various embodiments, processing subsystem 902 may execute a variety of programs in response to program code and may maintain multiple concurrently executing programs or processes. At any given time, some or all of the program code to be executed may be resident in processing subsystem 902 and/or in storage media such as storage device 904.

Through suitable programming, processing subsystem 902 may provide various functionality for controller device 900. For example, in some embodiments, processing subsystem 902 may implement various processes (or portions thereof) described above as being implemented by a controller. Processing subsystem 902 may also execute other programs to control other functions of controller device 900, including application programs that may be stored in storage device 904. In some embodiments, these application programs may interact with an accessory, e.g., by generating messages to be sent to the accessory and/or receiving messages from the accessory.

Communication interface 908 may provide voice and/or data communication capability for controller device 900. In some embodiments, communication interface 908 may include radio frequency (RF) transceiver components for accessing wireless voice and/or data networks (e.g., using cellular telephone technology, data network technology such as 3G, 4G/LTE, Wi-Fi (IEEE 902.11 family standards), or other mobile communication technologies, or any combination thereof), components for short-range wireless communication (e.g., using Bluetooth and/or Bluetooth LE standards, NFC, etc.), and/or other components. In some embodiments, communication interface 908 may provide wired network connectivity (e.g., Ethernet) in addition to or instead of a wireless interface. Communication interface 908 may be implemented using a combination of hardware (e.g., driver circuits, antennas, modulators/demodulators, encoders/decoders, and other analog and/or digital signal processing circuits) and software components. In some embodiments, communication interface 908 may support multiple communication channels concurrently, using the same transport or different transports.

Figure 10:
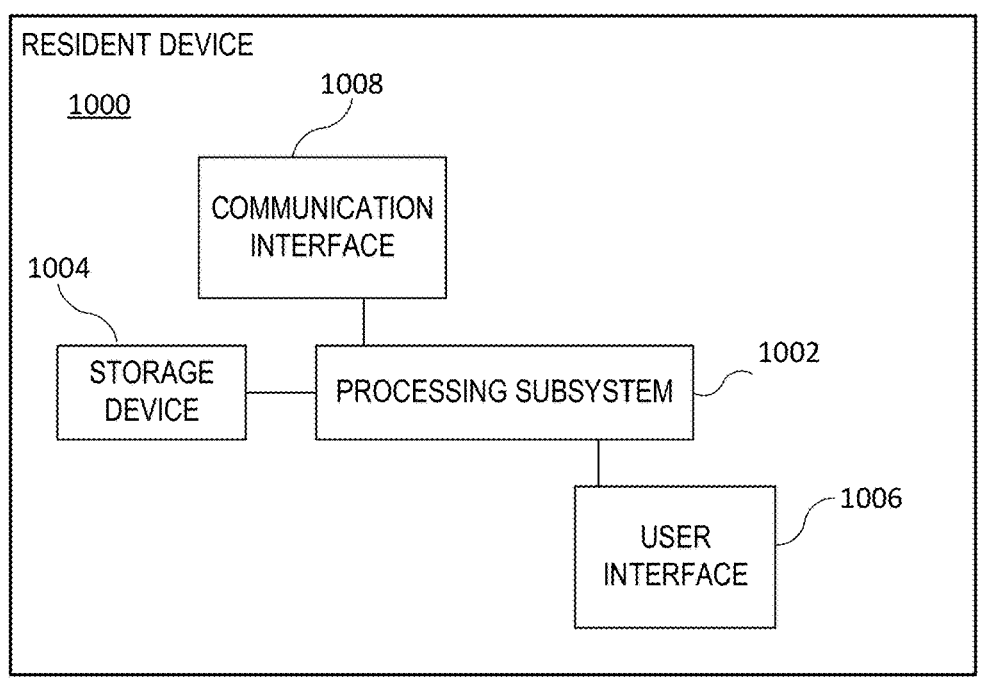
FIG. 10 is a simplified block diagram of a resident device, according to one or more embodiments.

FIG. 10 is a simplified block diagram of a resident device 1000, according to one or more embodiments. Resident device 1000 may implement any or all of the controller functions, behaviors, and capabilities described herein, as well as other functions, behaviors, and capabilities not expressly described. resident device 1000 may include processing subsystem 1002, storage device 1004, user interface 1006, communication interface 1008. Resident device 1000 may also include other components (not explicitly shown) such as a battery, power controllers, and other components operable to provide various enhanced capabilities. In various embodiments, resident device 1000 may be implemented in a desktop computer, laptop computer, tablet computer, smart phone, wearable computing device, or other systems having any desired form factor. Further, as noted above, resident device 1000 may be implemented partly in a base station and partly in a mobile unit that communicates with the base station and provides a user interface. In some examples, the resident device 1000 may not have a screen, and thus the user interface 1006 may be implemented on another device (e.g., the mobile unit) or not at all.

Storage device 1004 may be implemented, e.g., using disk, flash memory, or any other non-transitory storage medium, or a combination of media, and may include volatile and/or nonvolatile media. In some embodiments, storage device 1004 may store one or more application and/or operating system programs to be executed by processing subsystem 1002, including programs to implement various operations described above as being performed by a controller. For example, storage device 1004 may store a universal controller application that may read an accessory description record and generate a graphical user interface for controlling the accessory based on information therein. In some embodiments, portions (or all) of the controller functionality described herein may be implemented in operating system programs rather than applications. In some embodiments, storage device 1004 may also store apps designed for specific accessories or specific categories of accessories (e.g., an IP camera app to manage an IP camera accessory or a security app to interact with door lock accessories).

User interface 1006 may include input devices such as a touchpad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital converters, signal processors, or the like). A user may operate input devices of user interface 1006 to invoke the functionality of resident device 1000 and may view and/or hear output from resident device 1000 via output devices of user interface 1006.

Processing subsystem 1002 may be implemented as one or more integrated circuits, e.g., one or more single core or multi core microprocessors or microcontrollers, examples of which are known in the art. In operation, processing system 1002 may control the operation of resident device 1000. In various embodiments, processing subsystem 1002 may execute a variety of programs in response to program code and may maintain multiple concurrently executing programs or processes. At any given time, some or all of the program code to be executed may be resident in processing subsystem 1002 and/or in storage media such as storage device 1004.

Through suitable programming, processing subsystem 1002 may provide various functionality for resident device 1000. For example, in some embodiments, processing subsystem 1002 may implement various processes (or portions thereof) described above as being implemented by a controller. Processing subsystem 1002 may also execute other programs to control other functions of resident device 1000, including application programs that may be stored in storage device 1004. In some embodiments, these application programs may interact with an accessory, e.g., by generating messages to be sent to the accessory and/or receiving messages from the accessory.

Communication interface 1008 may provide voice and/or data communication capability for resident device 1000. In some embodiments, communication interface 1008 may include radio frequency (RF) transceiver components for accessing wireless voice and/or data networks (e.g., using cellular telephone technology, data network technology such as 3G, 4G/LTE, Wi-Fi (IEEE 902.11 family standards), or other mobile communication technologies, or any combination thereof), components for short-range wireless communication (e.g., using Bluetooth and/or Bluetooth LE standards, NFC, etc.), and/or other components. In some embodiments, communication interface 1008 may provide wired network connectivity (e.g., Ethernet) in addition to or instead of a wireless interface. Communication interface 1008 may be implemented using a combination of hardware (e.g., driver circuits, antennas, modulators/demodulators, encoders/decoders, and other analog and/or digital signal processing circuits) and software components. In some embodiments, communication interface 1008 may support multiple communication channels concurrently, using the same transport or different transports.

Figure 11:
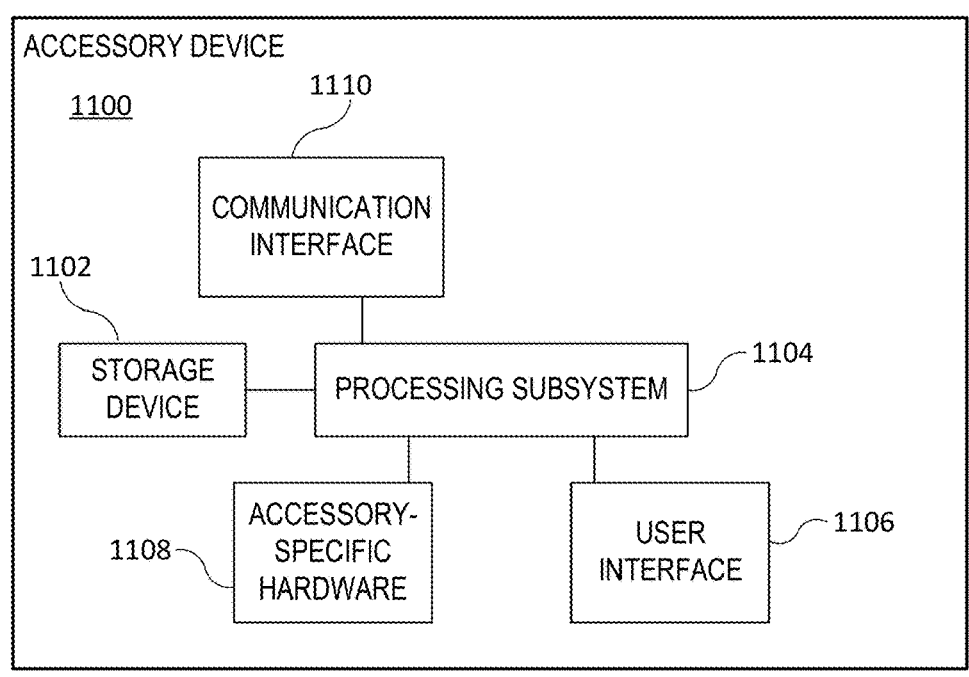
FIG. 11 is a simplified block diagram of an accessory device, according to one or more embodiments.

FIG. 11 is a simplified block diagram of an accessory device 1100, according to one or more embodiments. Accessory device 1100 may implement any or all of the accessory functions, behaviors, and capabilities described herein, as well as other functions, behaviors, and capabilities not expressly described. Accessory device 1100 may include storage device 1102, processing subsystem 1104, user interface 1106, accessory specific hardware 1108, communication interface 1110. Accessory device 1100 may also include other components (not explicitly shown) such as a battery, power controllers, and other components operable to provide various enhanced capabilities.

Accessory device 1100 is representative of a broad class of accessories that may be operated by a controller such as controller device 900, and such accessories may vary widely in capability, complexity, and form factor. Various accessories may include components not explicitly shown in FIG. 11, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1102 may be implemented, e.g., using disk, flash memory, or any other non-transitory storage medium, or a combination of media, and may include volatile and/or nonvolatile media. In some embodiments, storage device 1102 may store one or more application programs to be executed by processing subsystem 1104, including programs to implement various operations described above as being performed by an accessory, as well as operations related to particular accessory behaviors. Storage device 1102 may also store an accessory descriptor record (e.g., as described above) that may be furnished to controller devices, e.g., during device discovery as described above. Storage device 1102 may also store accessory state information and any other data that may be used during operation of accessory device 1100.

Processing subsystem 1104 may include, e.g., one or more single core or multi core microprocessors and/or microcontrollers executing program code to perform various functions associated with accessory device 1100. For example, processing subsystem 1104 may implement various processes (or portions thereof) described above as being implemented by an accessory, e.g., by executing program code stored in storage device 1102. Processing subsystem 1104 may also execute other programs to control other functions of accessory 3330. In some instances, programs executed by processing subsystem 1104 may interact with a controller (e.g., controller device 900), e.g., by generating messages to be sent to the controller and/or receiving messages from the controller.

User interface 1106 may include user operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital to analog or analog to digital converters, signal processors, or the like). Depending on the implementation of a particular accessory device 1100, a user may operate input devices of user interface 1106 to invoke functionality of accessory device 1100. Some accessories may provide minimal or no user interface. For example, as noted above with respect to the resident device 1000, the accessory device 1100 may not have a screen, and thus the user interface 1106 may be implemented on another device (e.g., a mobile unit or controller device) or not at all. In such instances, the accessories may be controlled via control instructions from another device (e.g., controller devices, resident devices, etc.).

Accessory specific hardware 1108 may include any other components that may be present in accessory device 1100 to enable its functionality. For example, in various embodiments accessory specific hardware 1108 may include one or more storage devices using fixed or removable storage media; GPS receiver; power supply and/or power management circuitry; a camera; a microphone; one or more actuators; environmental sensors (e.g., temperature sensor, pressure sensor, accelerometer, chemical sensor, etc.); and so on. It is to be understood that any type of accessory functionality may be supported by providing appropriate accessory specific hardware 1108.

Communication interface 1110 may provide voice and/or data communication capability for accessory device 1100. In some embodiments, communication interface 1110 may include radio frequency (RF) transceiver components for accessing wireless voice and/or data networks (e.g., using cellular telephone technology, data network technology such as 3G, 4G/LTE, Wi-Fi (IEEE 902.11 family standards), or other mobile communication technologies, or any combination thereof), components for short-range wireless communication (e.g., using Bluetooth and/or Bluetooth LE standards, NFC, etc.), and/or other components. In some embodiments, communication interface 1110 may provide wired network connectivity (e.g., Ethernet) in addition to or instead of a wireless interface. Communication interface 1110 may be implemented using a combination of hardware (e.g., driver circuits, antennas, modulators/demodulators, encoders/decoders, and other analog and/or digital signal processing circuits) and software components. In some embodiments, communication interface 1110 may support multiple communication channels concurrently, using the same transport or different transports.

Accessory device 1100 may be any electronic apparatus that interacts with controller device 900. In some embodiments, controller device 900 may provide remote control over operations of accessory device 1100 as described above. For example, accessory device 1100 may provide a remote user interface for accessory device 1100 that may include both input and output controls (e.g., a display screen to display current status information obtained from accessory device 1100 and an input control such as a touchscreen overlay to allow changes to the status information). Controller device 900 in various embodiments may control any function of accessory device 1100 and may also receive data from accessory device 1100.

It will be appreciated that the system configurations and components described herein are illustrative and that variations and modifications are possible. The controller and/or accessory may have other capabilities not specifically described herein (e.g., mobile phone, global positioning system (GPS), broadband data communication, Internet connectivity, etc.). Depending on implementation, the devices may interoperate to provide any functionality supported by either (or both) devices or to provide functionality that is partly implemented in each device. In some embodiments, a particular accessory may have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments may be realized in a variety of apparatus including electronic devices implemented using any combination of circuitry and software.

While specific embodiments have been described, one skilled in the art will recognize that numerous modifications are possible. A single controller may use processes described herein to establish pairings with any number of accessories and to selectively communicate with different accessories at different times. Similarly, a single accessory may be controlled by multiple controllers with which it has established pairings. Any function of an accessory may be controlled by modeling the function as a service having one or more characteristics and allowing a controller to interact with (e.g., read, modify, receive updates) the service and/or its characteristics. Accordingly, protocols and communication processes as described herein may be "universal," meaning that they may be applied in any context with one or more controllers and one or more accessories regardless of accessory function or controller form factor or specific interfaces.

Thus, although specific embodiments have been described, it will be appreciated that embodiments may include all modifications and equivalents within the scope of the following claims.

As described above, one aspect of the present technology is the gathering and use of data to improve the delivery of messages from one device to one or more devices. The present disclosure contemplates that in some instances, this gathered data may include personal information data that uniquely identifies or may be used to identify a specific person. Such personal information data may include demographic data, location-based data, online identifiers, telephone numbers, email addresses, home addresses, data or records, date of birth, or any other personal information.

The present disclosure recognizes that the use of such personal information data, in the present technology, may be used to the benefit of users. For example, the personal information data may be used to deliver a command from a user profile on a computing device to one or more computing devices. Further, other uses for personal information data that benefit the user are also contemplated by the present disclosure. For instance, specific states of devices (e.g., accessory devices, such an thermostats and garage door openers, etc.) associated with the user may be transmitted from a device back to the user profile.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities may subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements may be provided to prevent or block access to such personal information data. For example, such as in the case of advertisement delivery services, the present technology may be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk may be minimized by limiting the collection of data and deleting data once it is no longer needed. In addition, and when applicable, including in certain health related applications, data de-identification may be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments may also be implemented without the need for accessing such personal information data. That is, the various embodiments of the present technology are not rendered inoperable due to the lack of all or a portion of such personal information data. For example, content may be selected and delivered to users based on aggregated non-personal information data or a bare minimum amount of personal information, such as the content being handled only on the user's device or other non-personal information available to the content delivery services.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein may be implemented on the same processor or different processors in any combination. Accordingly, where components or modules are described as being configured to perform certain operations, such configuration may be accomplished, e.g., by designing electronic circuits to perform the operation, by programming programmable electronic circuits (such as microprocessors)

to perform the operation, or any combination thereof. Processes may communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments may be utilized in any number of environments and applications beyond those described herein without departing from the broader spirit and scope of the specification. The specification and drawings are, accordingly, to be regarded as illustrative rather than restrictive.

What is claimed is:

1. A method, comprising:

receiving, by a first device, a first message from a second device using a first transmission protocol, the first message comprising a first control instruction for an accessory device and a first message identifier, wherein the accessory device is separate from the first device, wherein the first control instruction provides instructions to control the accessory device;

transmitting, by the first device and using the first transmission protocol, a second message to the accessory device, the second message comprising the first control instruction and a second message identifier;

receiving, by the first device, a third message from the second device using a second transmission protocol, the second message comprising a second control instruction for the accessory device and a third message identifier;

comparing, by the first device, the third message identifier with the first message identifier to determine whether the second control instruction is a duplicate of the first control instruction; and determining, by the first device, whether to transmit the third message to the accessory device based at least in part on the comparison of the third message identifier with the first message identifier.

2. The method of claim 1, wherein the method further comprises:

storing the first message identifier in local memory;

comparing the first message identifier with the third message identifier by performing a lookup in local memory to determine whether the third message identifier is a duplicate of the first message identifier; and determining whether to transmit the second message based at least in part on whether the third message identifier is a duplicate of the first message identifier.

3. The method of claim 1, wherein the method further comprises:

determining that the first message identifier is a duplicate of the second message identifier based at least in part on the comparison;

determining that the third message is a duplicate of the first message based at least in part on the determination that the first message identifier is a duplicate the third message identifier; and deduplicating the second message based at least in part on the determination.

4. The method of claim 3, wherein deduplicating the second message comprises storing the duplicate message at the first device or deleting the second message.

5. The method of claim 1, wherein the method further comprises:

determining that the third message identifier is different than the first message identifier based at least in part on the comparison; and transmitting the third message to the accessory device based at least in part on the determination that the third message identifier is different than the first message identifier.

6. The method of claim 1, wherein the method further comprises:

receiving a transmission from the accessory device indicating a state of the accessory device;

storing the state on the accessory device in local memory;

receiving a fourth message indicating a desired state of the accessory device;

comparing the state of the accessory device stored in memory and the desired state of the accessory device; and transmitting the second message to the accessory device based at least in part on the comparison of the state of the accessory device stored in memory and the desired state of the accessory device.

7. The method of claim 6, wherein the method further comprises generating the first control instruction based at least in part on the state of the accessory device being different than the desired state of the accessory device.

8. The method according to claim 1, wherein the first transmission protocol is one of WAN or LAN.

9. The method according to claim 1, wherein the first device is a resident device, and wherein the first device is configured for a home network.

10. A first device, comprising:

a processor; and a computer-readable medium including instructions that, when executed by the processor, cause the processor to perform operations comprising:

receiving a first message from a second device using a first transmission protocol, the first message comprising a first control instruction for an accessory device and a first message identifier, wherein the accessory device is separate from the first device, wherein the first control instruction provides instructions to control the accessory device;

transmitting, using the first transmission protocol, a second message to the accessory device, the second message comprising the first control instruction and a second message identifier;

receiving a third message from the second device using a second transmission protocol, the second message comprising a second control instruction for the accessory device and a third message identifier;

comparing the third message identifier with the first message identifier to determine whether the second control instruction is a duplicate of the first control instruction; and determining whether to transmit the second message to the accessory device based at least in part on the comparison of the third message identifier with the first message identifier.

11. The first device of claim 10, wherein the instructions that, when executed by the processor, further cause the processor to perform operations comprising:

storing the first message identifier in local memory;

comparing the first message identifier with the third message identifier by performing a lookup in local memory to determine whether the third message identifier is a duplicate of the first message identifier; and determining whether to transmit the second message based at least in part on whether the third message identifier is a duplicate of the first message identifier.

12. The first device of claim 10, wherein the instructions that, when executed by the processor, further cause the processor to perform operations comprising:

determining that the first message identifier is a duplicate of the second message identifier based at least in part on the comparison;

determining that the third message is a duplicate of the first message based at least in part on the determination that the first message identifier is a duplicate the third message identifier; and deduplicating the second message based at least in part on the determination, wherein deduplicating the second message comprises storing the duplicate message at the first device or deleting the second message.

13. The first device of claim 10, wherein the instructions that, when executed by the processor, further cause the processor to perform operations comprising:

determining that the third message identifier is different than the first message identifier based at least in part on the comparison; and transmitting the third message to the accessory device based at least in part on the determination that the third message identifier is different than the first message identifier.

14. The first device of claim 10, wherein the instructions that, when executed by the processor, further cause the processor to perform operations comprising:

receiving a transmission from the accessory device indicating a state of the accessory device;

storing the state on the accessory device in local memory;

receiving a fourth message indicating a desired state of the accessory device;

comparing the state of the accessory device stored in memory and the desired state of the accessory device; and transmitting the second message to the accessory device based at least in part on the comparison of the state of the accessory device stored in memory and the desired state of the accessory device.

15. The first device of claim 14, wherein the instructions that, when executed by the processor, further cause the processor to perform operations comprising generating the first control instruction based at least in part on the state of the accessory device being different than the desired state of the accessory device.

16. A non-transitory computer-readable medium including stored thereon a sequence of instructions that, when executed by a processor, causes the processor to perform operations comprising:

receiving, by a first device, a first message from a second device using a first transmission protocol, the first message comprising a first control instruction for an accessory device and a first message identifier, wherein the accessory device is separate from the first device, wherein the first control instruction provides instructions to control the accessory device;

transmitting, using the first transmission protocol, a second message to the accessory device, the second message comprising the first control instruction and a second message identifier;

receiving a third message from the second device using a second transmission protocol, the second message comprising a second control instruction for the accessory device and a third message identifier;

comparing the third message identifier with the first message identifier to determine whether the second control instruction is a duplicate of the first control instruction; and determining whether to transmit the second message to the accessory device based at least in part on the comparison of the third message identifier with the first message identifier.

17. The non-transitory computer-readable medium of claim 16, wherein the instructions that, when executed by the processor, further cause the processor to perform operations comprising:

storing the first message identifier in local memory;

comparing the first message identifier with the third message identifier by performing a lookup in local memory to determine whether the third message identifier is a duplicate of the first message identifier; and determining whether to transmit the second message based at least in part on whether the third message identifier is a duplicate of the first message identifier.

18. The non-transitory computer-readable medium of claim 16, wherein the instructions that, when executed by the processor, further cause the processor to perform operations comprising:

determining that the first message identifier is a duplicate of the second message identifier based at least in part on the comparison;

determining that the third message is a duplicate of the first message based at least in part on the determination that the first message identifier is a duplicate the third message identifier; and deduplicating the second message based at least in part on the determination, wherein deduplicating the second message comprises storing the duplicate message at the first device or deleting the second message.

19. The non-transitory computer-readable medium of claim 16, wherein the instructions that, when executed by the processor, further cause the processor to perform operations comprising:

determining that the third message identifier is different than the first message identifier based at least in part on the comparison; and transmitting the third message to the accessory device based at least in part on the determination that the third message identifier is different than the first message identifier.

20. The non-transitory computer-readable medium of claim 16, wherein the instructions that, when executed by the processor, further cause the processor to perform operations comprising:

receiving a transmission from the accessory device indicating a state of the accessory device;

storing the state on the accessory device in local memory;

receiving a fourth message indicating a desired state of the accessory device;

comparing the state of the accessory device stored in memory and the desired state of the accessory device; and transmitting the second message to the accessory device based at least in part on the comparison of the state of the accessory device stored in memory and the desired state of the accessory device.

* * * * *